US009655048B2

United States Patent
Liu et al.

(10) Patent No.: US 9,655,048 B2
(45) Date of Patent: May 16, 2017

(54) SYSTEM AND METHOD FOR DISCONTINUOUS TRANSMISSIONS AND MEASUREMENTS

(71) Applicant: Futurewei Technologies, Inc., Plano, TX (US)

(72) Inventors: Jialing Liu, Palatine, IL (US); Weimin Xiao, Hoffman Estates, IL (US); Vipul Desai, Palatine, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 44 days.

(21) Appl. No.: 14/679,282

(22) Filed: Apr. 6, 2015

(65) Prior Publication Data

US 2015/0289208 A1 Oct. 8, 2015

Related U.S. Application Data

(60) Provisional application No. 61/976,363, filed on Apr. 7, 2014.

(51) Int. Cl.
*H04W 52/02* (2009.01)
*H04L 1/18* (2006.01)

(52) U.S. Cl.
CPC ....... *H04W 52/0229* (2013.01); *H04L 1/1887* (2013.01)

(58) Field of Classification Search
CPC .................. H04L 1/1887; H04W 52/0229
See application file for complete search history.

(56) References Cited

U.S. PATENT DOCUMENTS

| 2011/0090866 | A1* | 4/2011 | Yang | ..................... | H04W 36/14 370/331 |
| 2012/0113839 | A1* | 5/2012 | Etemad | .................. | H04B 7/024 370/252 |

(Continued)

FOREIGN PATENT DOCUMENTS

| CN | 102131275 A | 7/2011 |
| CN | 103238368 A | 8/2013 |

(Continued)

OTHER PUBLICATIONS

International Search Report of Patent Coorporation Treaty (PCT), International Application No. PCT/CN2015/075981, Applicant Huawei Technologies Co., Ltd., date of mailing Jul. 7, 2015, 11 pages.

(Continued)

*Primary Examiner* — Brian D Nguyen
(74) *Attorney, Agent, or Firm* — Slater Matsil, LLP

(57) ABSTRACT

A method for operating a first communications controller adapted for operation in a first communications band in a communications system with a plurality of communications bands includes signaling a first higher layer message to a user device in the first communications carrier, the first higher layer message including information regarding an activation of operations in a second communications carrier, coordinating with a second communications controller adapted for operations in the second communications carrier, an opportunistic transmission opportunity in the second communication carrier, generating a first physical layer message comprising an aperiodic trigger configured to prompt a channel measurement in accordance with a reference signal transmitted in the second communications carrier, the first physical layer message serving as an indication of the opportunistic transmission opportunity, and signaling (Continued)

the first physical layer message to the user device in the first communications carrier.

40 Claims, 26 Drawing Sheets

(56) References Cited

U.S. PATENT DOCUMENTS

| | | |
|---|---|---|
| 2012/0140743 A1 | 6/2012 | Pelletier et al. |
| 2012/0214541 A1 | 8/2012 | Narasimha et al. |
| 2012/0281563 A1* | 11/2012 | Comsa .................. H04W 24/10 370/252 |
| 2013/0053034 A1* | 2/2013 | Lee .......................... H04W 4/02 455/436 |
| 2013/0064226 A1 | 3/2013 | Dinan |
| 2013/0329583 A1* | 12/2013 | Vrzic .................... H04W 36/30 370/252 |
| 2013/0329694 A1* | 12/2013 | Vrzic .................. H04W 36/165 370/331 |
| 2014/0169322 A1* | 6/2014 | Ouchi ................. H04W 52/146 370/329 |
| 2014/0248862 A1* | 9/2014 | Periyalwar ............ H04W 48/18 455/418 |
| 2015/0050939 A1 | 2/2015 | Futaki et al. |

FOREIGN PATENT DOCUMENTS

| | | |
|---|---|---|
| NO | 2012078565 A1 | 6/2012 |
| NO | 2013161135 A1 | 10/2013 |

OTHER PUBLICATIONS

"Broadband Radio Access Networks (BRAN); 5 GHz high performance RLAN; Harmonized EN covering the essential requirements of article 3.2 of the R&TTE Directive," Draft ETSI EN 301 893 V1.7.2, Harmonized European Standard, ETSI, Jul. 2014, 95 pages.

* cited by examiner

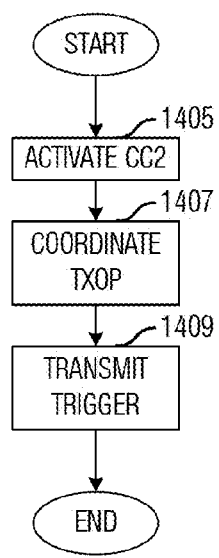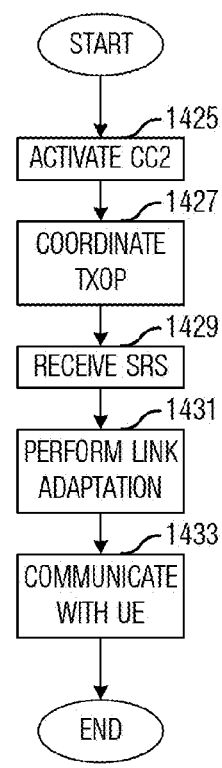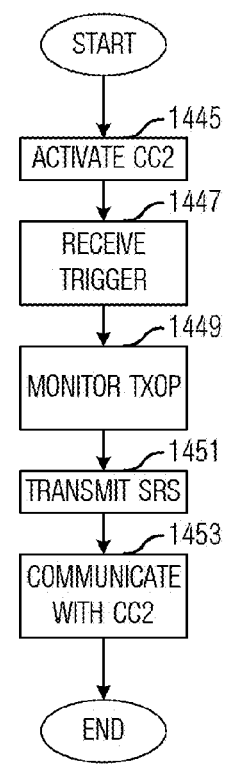
Fig. 14a
Fig. 14b
Fig. 14c

SYSTEM AND METHOD FOR DISCONTINUOUS TRANSMISSIONS AND MEASUREMENTS

This application claims the benefit of U.S. Provisional Application No. 61/976,363, filed on Apr. 7, 2014, entitled "Device, Network, and Method for Discontinuous Transmissions and Measurements," which application is hereby incorporated herein by reference.

TECHNICAL FIELD

The present disclosure relates generally to digital communications, and more particularly to a system and method for discontinuous transmissions and measurements.

BACKGROUND

The amount of wireless data being transferred is expected to exceed that of wired data, pushing the limits of macro cellular deployment. Small cell deployment with higher density and/or with new and diversified spectrum resources may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity and applications for homes and businesses, as well as metropolitan and rural public spaces. Different types of small cells include, generally from smallest size to largest size, femtocells, picocells, and microcells. Small cells may be densely deployed and may also utilize additional spectrum resources, such as unlicensed spectrum resources.

SUMMARY OF THE DISCLOSURE

Example embodiments of the present disclosure which provide a system and method for discontinuous transmissions and measurements.

In accordance with an example embodiment of the present disclosure, a method for operating a first communications controller adapted for operation in a first communications carrier of a communications system with a plurality of communications carriers is provided. The method includes signaling a first higher layer message to a user device in the first communications carrier, the first higher layer message including information regarding an activation of operations in a second communications carrier, and coordinating with a second communications controller adapted for operations in the second communications carrier, an opportunistic transmission opportunity in the second communication carrier. The method includes generating a first physical layer message comprising an aperiodic trigger configured to prompt a channel measurement in accordance with a reference signal transmitted in the second communications carrier, the first physical layer message serving as an indication of the opportunistic transmission opportunity, and signaling the first physical layer message to the user device in the first communications carrier.

In accordance with another example embodiment of the present disclosure, a method for operating a user device adapted for operation in a communications system with a plurality of communications carriers is provided. The method includes receiving a first higher layer message from a first communications controller over a first communications carrier, the first higher layer message including information regarding an activation of a second communications carrier, and receiving a first physical layer message from the first communications controller over the first communications carrier, the first physical layer message including an aperiodic trigger configured to initiate a channel measurement procedure in the second communications carrier, the first physical layer message serving as an indication of an opportunistic transmission opportunity in the second communications carrier. The method also includes monitoring the opportunistic transmission opportunity in the second communications carrier, and participating in the channel measurement procedure in the second communications carrier.

In accordance with another example embodiment of the present disclosure, a first communications controller adapted for operation in a first communications carrier of a communications system with a plurality of communications carriers is provided. The first communications controller includes a processor, and a computer readable storage medium storing programming for execution by the processor. The programming including instructions to signal a first higher layer message to a user device in the first communications carrier, the first higher layer message including information regarding an activation of operations in a second communications carrier, coordinate with a second communications controller adapted for operations in the second communications carrier, an opportunistic transmission opportunity in the second communication carrier, generate a first physical layer message comprising an aperiodic trigger configured to prompt a channel measurement in accordance with a reference signal transmitted in the second communications carrier, the first physical layer message serving as an indication of the opportunistic transmission opportunity, and signal the first physical layer message to the user device in the first communications carrier.

In accordance with another example embodiment of the present disclosure, a user device adapted for operation in a communications system with a plurality of communications carriers is provided. The user device a processor, and a computer readable storage medium storing programming for execution by the processor. The programming including instructions to receive a first higher layer message from a first communications controller over a first communications carrier, the first higher layer message including information regarding an activation of a second communications carrier, receive a first physical layer message from the first communications controller over the first communications carrier, the first physical layer message including an aperiodic trigger configured to initiate a channel measurement procedure in the second communications carrier, the first physical layer message serving as an indication of an opportunistic transmission opportunity in the second communications carrier, monitor the opportunistic transmission opportunity in the second communications carrier, and participate in the channel measurement procedure in the second communications carrier.

One advantage of an embodiment is that operation in both licensed and unlicensed spectrum results in a larger number of available communications resources to allow better performance, especially in heavily populated deployments.

A further advantage of an embodiment is that it is spectrum agnostic. Spectrum agnostic solutions allow operation in wide varieties of licensed and unlicensed spectrum without requiring redesign or new designs for new varieties of spectrum.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 14a illustrates a flow diagram of example operations occurring in a cellular cell operating in a licensed carrier highlighting a second example design of CSI measurement/feedback on demand for link adaptation according to example embodiments described herein;

FIG. 14b illustrates a flow diagram of example operations occurring in an opportunistically on/off cell operating in a licensed or an unlicensed carrier highlighting a second example design of CSI measurement/feedback on demand for link adaptation according to example embodiments described herein;

FIG. 14c illustrates a flow diagram of example operations occurring in a UE highlighting a second example design of CSI measurement/feedback on demand for link adaptation according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to discontinuous transmissions and measurements. For example, a first communications controller generates an aperiodic trigger configured to prompt a measurement in a second communications carrier, and transmits the aperiodic trigger over a first communications carrier to a user device.

The present disclosure will be described with respect to example embodiments in a specific context, namely communications systems that support both licensed and unlicensed spectrum. The disclosure may be applied to standards compliant communications systems, such as those that are compliant with Third Generation Partnership Project (3GPP), IEEE 802.11, and the like, technical standards, and non-standards compliant communications systems, that support both licensed and unlicensed spectrum.

Figure 1:
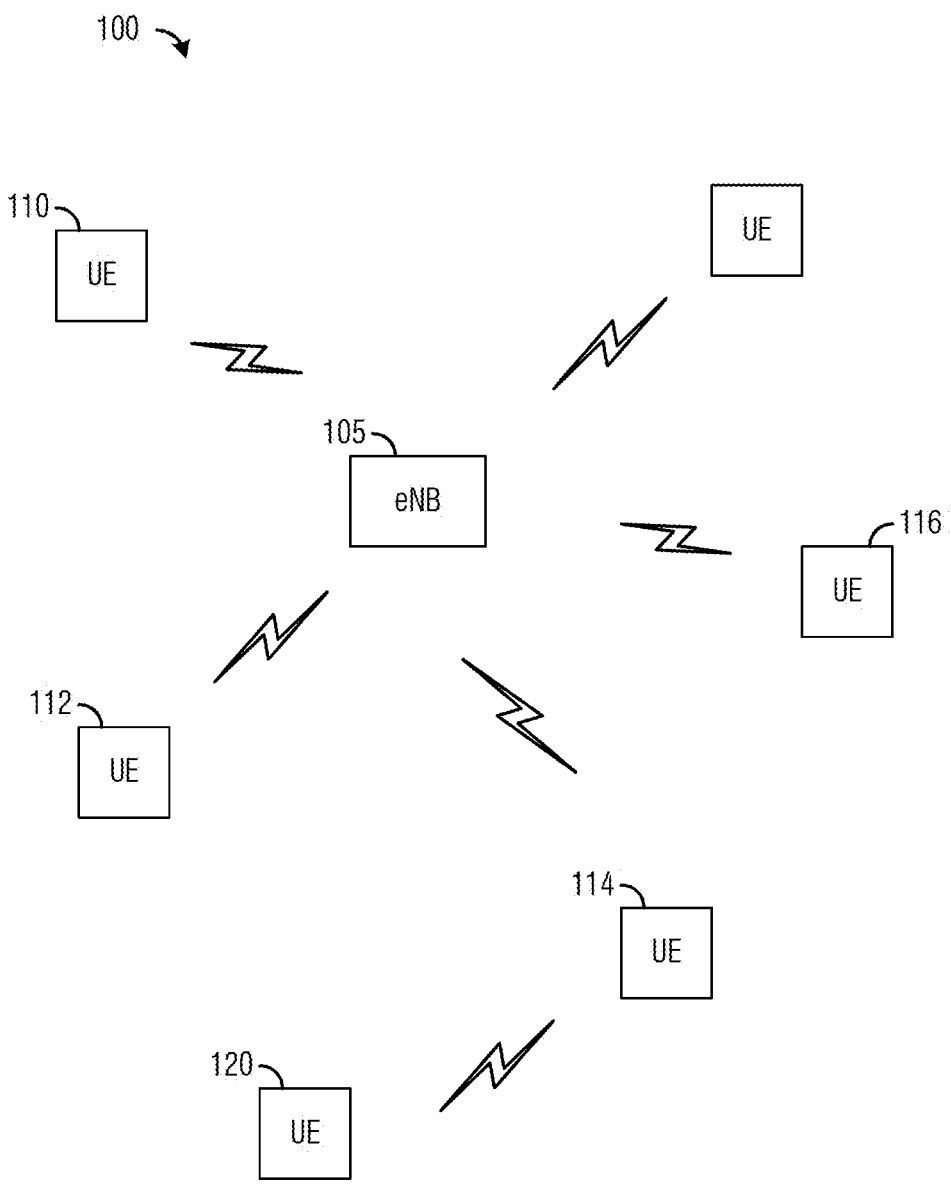
FIG. 1 illustrates an example communications system according to example embodiments described herein.

FIG. 1 illustrates an example communications system 100. Communications system 100 includes an evolved NodeB (eNB) 105 serving a plurality of user equipments (UEs) 110, 112, 114, 116. In a first operating mode, transmissions for UEs as well as transmissions by UEs pass through the eNB. The eNB allocates communications resources for the transmissions to or from the UEs. eNBs may also be commonly referred to as base stations, NodeBs, transmission points, remote radio heads, or access points, and the like, while UEs may also be commonly referred to as mobiles, mobile stations, terminals, subscribers, users, wireless devices, and the like. Communications resources may be time resources, frequency resources, code resources, time-frequency resources, and the like. Communications system 100 can also include communication between UEs, such as UE 114 and UE 120. As an illustrative example, UE 114 and UE 120 are engaged in device to device communication and/or discovery, and UE 114 can relay messages between UE 120 and eNB 105.

While it is understood that communications systems may employ multiple APs capable of communicating with a number of UEs, only two APs, and a number of UEs are illustrated for simplicity.

Typically, in a modern wireless communications system, such as a Third Generation Partnership Project (3GPP) Long Term Evolution (LTE) compliant communications system, a plurality of cells or eNBs may be arranged into a cluster of cells, with each cell having multiple transmit antennas. Additionally, each cell or eNB may be serving a number of users based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

Figure 2A:
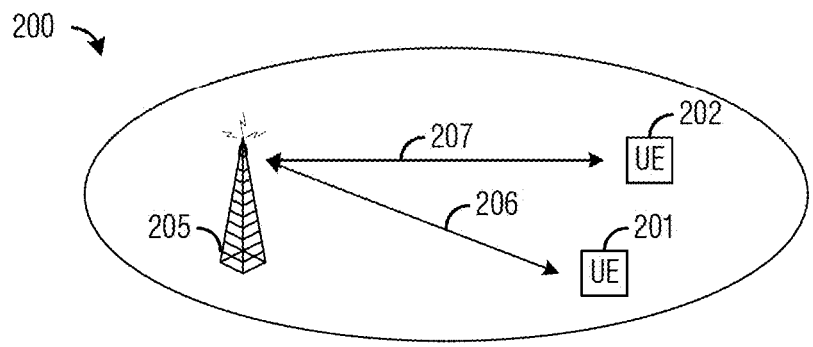
FIG. 2a illustrates an example communications system highlighting an eNB serving 2 UEs according to example embodiments described herein.

FIG. 2a illustrates an example communications system 200 highlighting an eNB serving 2 UEs. Communications system 200 is a typical wireless network with an eNB 205 communicating with a first UE 201 over a wireless link 206 and with a second wireless device 202 over a second wireless link 207. The wireless links 206 and 207 may comprise a single carrier frequency such as used typically for a time division duplex (TDD) configuration or a pair of carrier frequencies as used in a frequency division duplex (FDD) configuration. Not shown in communications system 200 are some of the network elements used to support the eNB 205 such as a backhaul, management entities, and the like. The transmission/reception from an eNB to a UE may be referred to as a downlink (DL) transmission/reception, and the transmission/reception from a UE to an eNB may be referred to as an uplink (UL) transmission/reception.

Figure 2B:
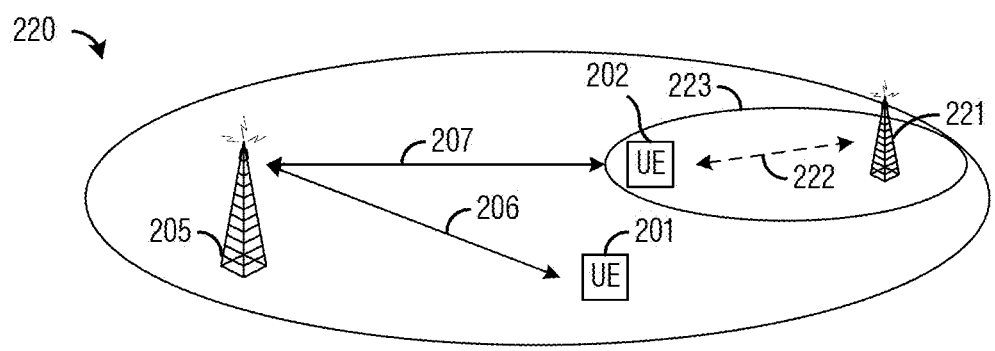
FIG. 2b illustrates an example communications system consistent with a wireless heterogeneous network deployment according to example embodiments described herein.

FIG. 2b illustrates an example communications system 220 consistent with a wireless heterogeneous network (HetNet) deployment. Communications system 220 includes an eNB 205 communicating with first UE 201 over wireless link 206 and a second UE 202 over wireless link 207. A second eNB 221, such as a pico cell, a femto cell, a small cell, and the like, has a coverage area 223 and is capable of communicating with second UE 202 over wireless link 222. Typically, wireless link 222 and wireless links 206 and 207 use the same carrier frequencies, but wireless link 222 and wireless links 206 and 207 may use different frequencies. There may be a backhaul (not shown) connecting eNB 205 and second eNB 221. A HetNet may include a macro cell and a pico cell, or generally, a higher power node/antenna with a larger coverage area and lower power nodes/antennas with smaller coverage areas. Lower power nodes (or lower power points, picos, femtos, micros, relay nodes, remote radio heads (RRHs), remote radio units, distributed antennas, and the like) generally are low-power wireless access points that operate in a licensed spectrum. Small cells may use lower power nodes. Lower power nodes provide improved cellular coverage, capacity, and applications for homes and businesses, as well as metropolitan and rural public areas.

In an example network, such as communications system 220 shown in FIG. 2b, there may be multiple macro cells (e.g., eNB 205) and multiple pico cells (e.g., second eNB 221) operating with multiple component carriers, and a backhaul between any two cells may be a fast backhaul or a slow backhaul depending on the deployment. When two cells are connected by a fast backhaul, the fast backhaul may be fully utilized (e.g., to simplify the communications method and system or to improve coordination). As an illustrative example, to support transmission or reception for a UE, multiple cells may be involved, with some pairs of cells having fast backhauls, while other pairs of cells may have slow backhauls or "any backhaul". "Any backhaul" may be used to indicate the presence of a backhaul without being specific regarding the backhaul being a fast backhaul or a slow backhaul.

In an example deployment, an eNB may control one or more cells. Multiple remote radio units may be connected to the same base band unit of the eNB by fiber optic cables, and the latency between base band unit and remote radio unit is quite small. Therefore the same base band unit can process the coordinated transmission/reception of multiple cells. As an illustrative example, the eNB may coordinate the transmissions of multiple cells to a single UE, which may be referred to as coordinated multiple point (CoMP) transmission. The eNB may also coordinate the reception of a single UE to multiple cells, which may be referred to as CoMP reception. In this example, the backhaul between the cells and the eNB is fast backhaul and the scheduling of data transmitted by different cells to the UE can be easily coordinated in the eNB.

As an extension of a HetNet deployment, the possibly of densely deployed small cells using low power nodes are being considered as a promising way to cope with an explosion in mobile traffic, especially for hotspot deployments in indoor and outdoor scenarios. A low power node generally implies a node with a transmission power level that is lower than that of a macro node or a base station, for example Pico and Femto eNBs are normally considered to be low power nodes. Small cell enhancements for E-UTRA and E-UTRAN, which is an ongoing study in 3GPP, will focus on additional functionalities for enhanced performance in hotspot areas for indoor and outdoor using possibly densely deployed low power nodes.

Figure 2C:
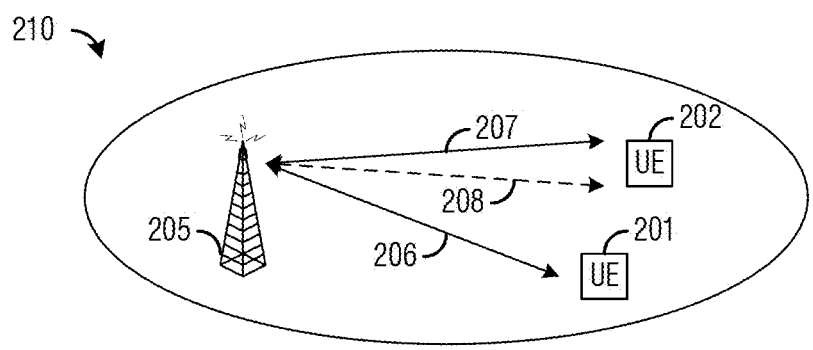
FIG. 2c illustrates an example communications system highlighting carrier aggregation according to example embodiments described herein.

FIG. 2c illustrates an example communications system 210 highlighting carrier aggregation (CA). Communications system 210 includes an eNB 205 that may communicate with UE 201 over wireless link 206 and with UE 202 with wireless links 207 and 208. In some example deployments, for UE 202 wireless link 207 may be referred to as a primary component carrier (PCC) while wireless link 208 may be referred to as a secondary component carrier (SCC). In some CA deployments, the PCC may be used to provide feedback from the UE to the eNB, while the SCC may carry data traffic. In accordance with the 3GPP LTE Release-10 specifications, a CC may be referred to as a cell. When multiple cells are controlled by a single eNB, the implementation of cross scheduling of multiple cells is possible since there may be a single scheduler in the single eNB that allows the scheduling of the multiple cells. With CA, one eNB may operate and control several CCs forming a primary cell (Pcell) and a secondary cell (Scell). In accordance with the 3GPP LTE Release-11 specifications, an eNB may control both a macro cell and a pico cell. In such a situation, a backhaul between the macro cell and the pico cell is a fast backhaul. The eNB may control the transmission/reception of both macro cell and pico dynamically.

Figure 2D:
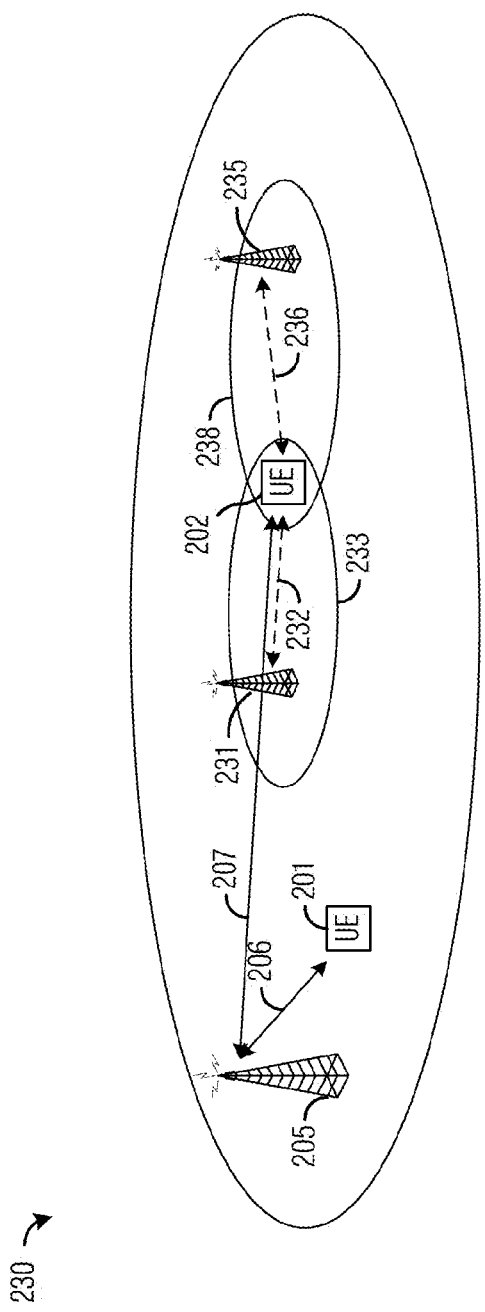
FIG. 2d illustrates an example communications system highlighting a HetNet deployment and CoMP operation according to example embodiments described herein.

FIG. 2d illustrates an example communications system 230 highlighting a HetNet deployment and CoMP operation. Communications system 230 includes an eNB 205 communicating with UE 201 with wireless link 206 and UE 202 with wireless link 207. A second eNB 231, such as a small cell, for example, has a coverage area 233 and is capable of communicating with UE 202 with wireless link 232. A third eNB 235, such as another small cell, for example, has a coverage area 238 and is capable of communicating with UE 202 with wireless link 236. Coverage areas 233 and 238 may overlap. The carrier frequencies of wireless links 206, 232, and 236 may be the same or different.

Figure 2E:
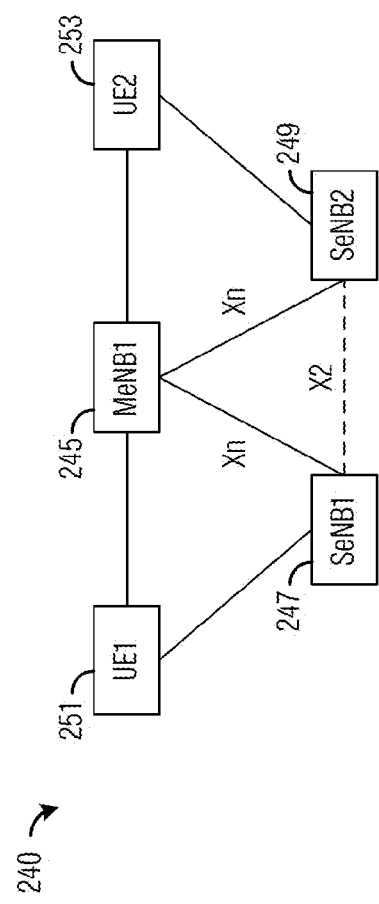
FIG. 2e illustrates an example communications system configured for dual connectivity according to example embodiments described herein.

FIG. 2e illustrates an example communications system 240 configured for dual connectivity. Communications system 240 may include a master eNB (MeNB) 245 that is connected to one or more secondary eNB (SeNBs), such as SeNBs 247 and 249, using an interface such as the Xn interface (the Xn interface may be an X2 interface in some specific situations). The backhaul may support such an interface. Between the SeNBs 247 and 249, there may be an X2 interface. A first UE, such as UE 251, may be connected wirelessly to MeNB 245 and SeNB 247, while a second UE, such as UE 253, may be connected wirelessly to MeNB 245 and SeNB 249.

In orthogonal frequency-division multiplexing (OFDM) communications systems, the frequency bandwidth is divided into multiple subcarriers in frequency domain. In the time domain, one subframe is divided into multiple OFDM symbols. Each OFDM symbol may have a cyclic prefix to avoid the inter-symbol interference due to multiple path delays. One resource element (RE) is defined by the time-frequency resource within one subcarrier and one OFDM symbol. A reference signal and other signals, such as a data channel, e.g., a physical downlink shared channel (PDSCH), and a control channel, e.g., a physical downlink control channel (PDCCH), are orthogonal and multiplexed in different resource elements in time-frequency domain. Further, the signals are modulated and mapped onto resource elements. For each OFDM symbol, the signals in the frequency domain are transformed into the signals in time domain using, e.g., Fourier transforms, and are transmitted with added cyclic prefix to avoid the inter-symbol interference.

Figure 3A:
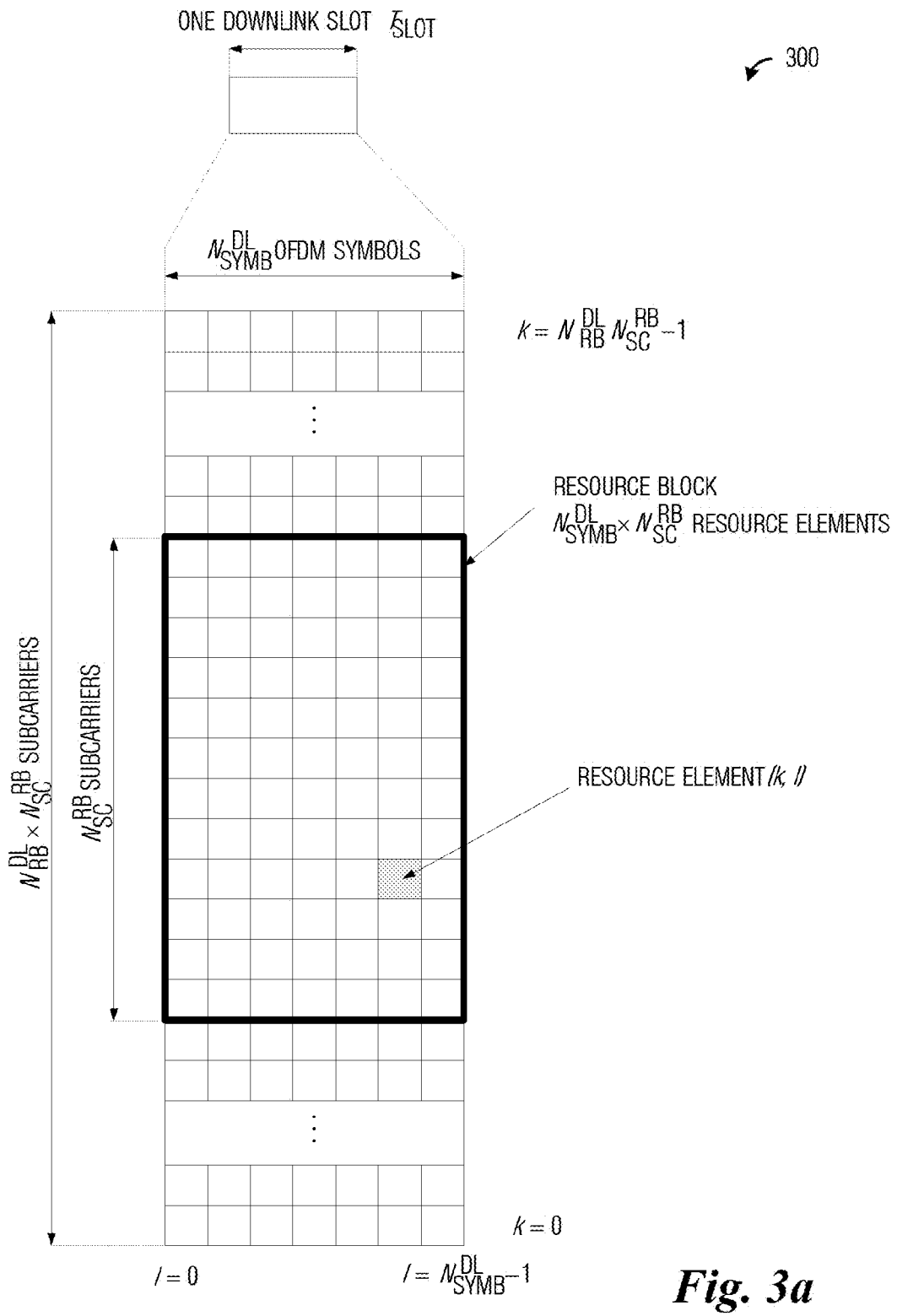
FIG. 3a illustrates example OFDM symbols with normal cyclic prefix according to example embodiments described herein.

FIG. 3a illustrates example OFDM symbols 300 with normal cyclic prefix (CP). Each resource block (RB) contains a number of REs. There are 14 OFDM symbols labeled from 0 to 13 in each subframe. The symbols 0 to 6 in each subframe correspond to even numbered slots, and the symbols 7 to 13 in each subframe correspond to odd numbered slots. In the figure, only one slot of a subframe is shown. There are 12 subcarriers labeled from 0 to 11 in each RB, and hence in this example, there are 12×14=168 REs in a RB pair (an RB is 12 subcarriers by the number of symbols in a slot). In each subframe, there are a number of RBs, and the number may depend on the bandwidth (BW).

Figure 3B:
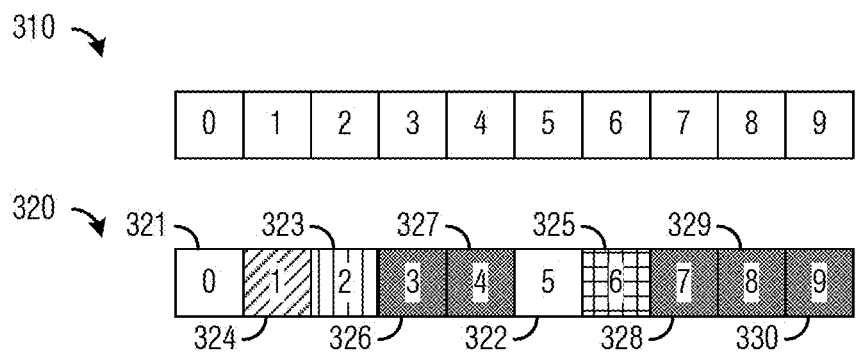
FIG. 3b illustrates example frame configurations used in 3GPP LTE according to example embodiments described herein.

FIG. 3b illustrates example frame configurations 310 and 320 used in 3GPP LTE. Frame 310 is typically used for a FDD configuration, where all 10 subframes, labeled 0 through 9, communicate in the same direction (downlink in this example). Each subframe is 1 millisecond in duration and each frame is 10 milliseconds in duration. Frame 320 is generally used for a TDD configuration where certain subframes are allocated for downlink transmissions (such as unshaded boxes (subframes 0 321 and 5 322), for uplink transmissions (vertical lines (subframe 2 323)), and special (striped box (subframe 1 324)) which contain both uplink and downlink transmissions. An entire subframe dedicated for downlink (uplink) transmission can be called a downlink (uplink) subframe. Subframe 6 325 can be either a downlink or a special subframe depending on TDD configuration. Each of the solid shaded boxes (subframes 3 326, 4 327, 7 328, 8 329, and 9 330) can be either a downlink subframe or an uplink subframe depending on TDD configuration. The configuration shown in frame 320 is intended for discussion purposes and is based on the 3GPP technical standards TSG 36.211 Release-11.

Figure 3C:
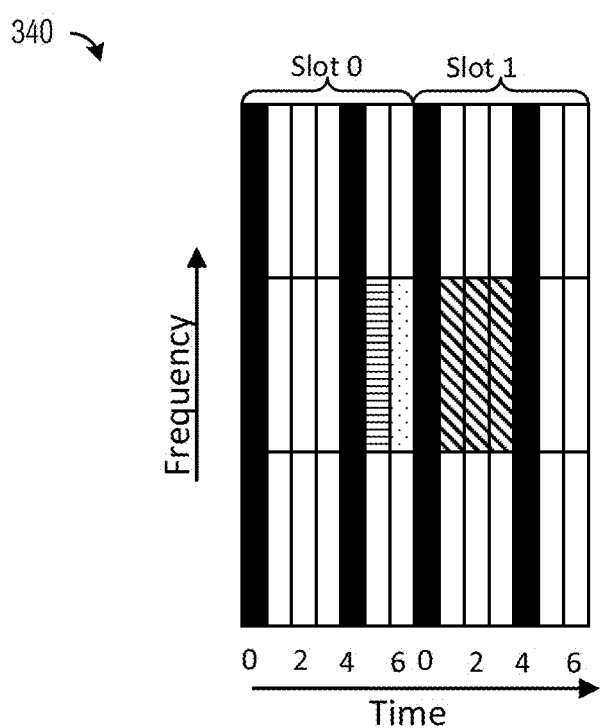
FIGS. 3c and 3d illustrate examples of downlink subframes partitioned in terms of symbol and frequency according to example embodiments described herein.
Figure 3D:
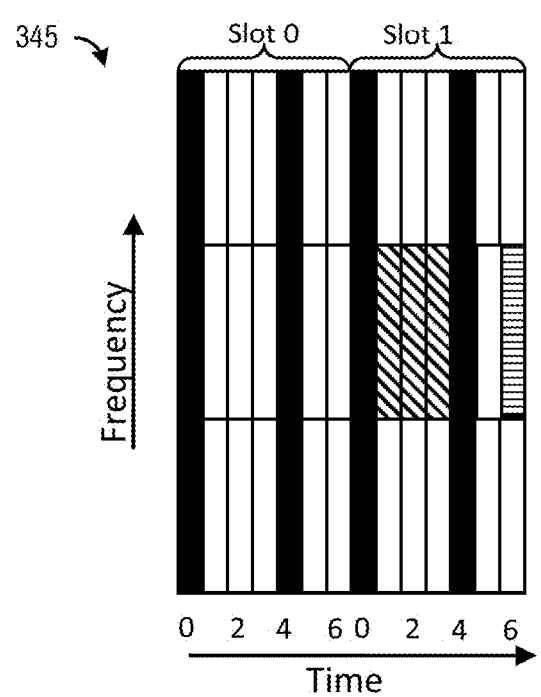
Figure 3D:
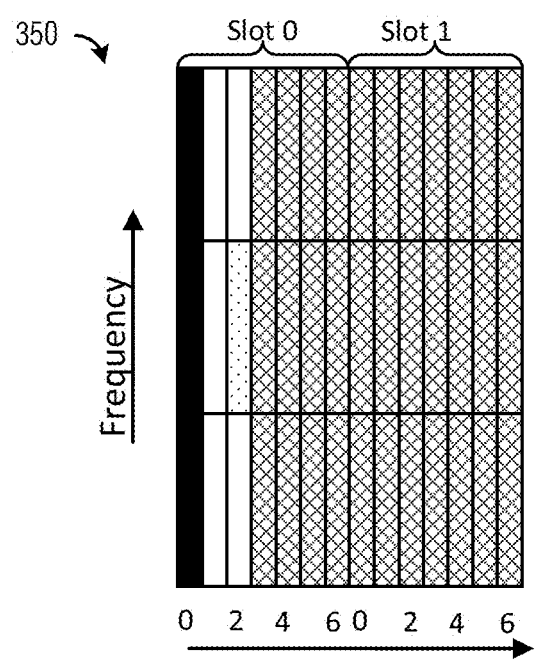

FIGS. 3c and 3d illustrate examples of downlink subframes partitioned in terms of symbol and frequency. A subframe, such as subframe 340, is divided into 3 sections in the frequency domain (assuming the number of RBs is greater than 6). An analogous diagram can be shown for a 6 RBs downlink bandwidth (e.g., bandwidth of the downlink carrier).

As shown in FIG. 3c, subframe 340 illustrates an example of the symbol allocation for an FDD configuration for subframes 0 and 5. The solid shading shows the symbols that have the common reference signal (CRS). The example is shown under the assumption that either CRS is transmitted on antenna port 0 or on antenna ports 0 and 1. The horizontal crosshatching shows the location of the secondary synchronization signal (SSS). The dotted crosshatching shows the location of the primary synchronization signal (PSS). Both the PSS and SSS occupy the center six resource blocks of the downlink carrier. The diagonal lines in symbols 0, 1, 2, 3 of slot 1 represent the location where the physical broadcast channel (PBCH) occupies for subframe 0. The PBCH is not transmitted in subframe 5 in Release-11 of the 3GPP LTE technical standards. It is noted that the PSS, SSS, and CRS may be viewed as overhead.

As shown in FIG. 3d, subframe 345 illustrates an example of the symbol allocation for subframes 0 321 and 5 322 of TDD subframe 320 of FIG. 3b. Likewise, subframe 350 shows an example of the symbol allocation for subframes 1 324 and 6 325 of TDD subframe 320. In both subframe 345 and subframe 350, the solid shading shows the symbols having the CRS. The example is shown under the assumption that either CRS is transmitted on antenna port 0 or on antenna ports 0 and 1. The horizontal shading in subframe 345 shows the location of the SSS. The dotted shading in subframe 350 shows the location of the PSS. Both the PSS and SSS occupy the center six RBs of the downlink carrier. The cross shading in subframe 350 indicates that the remaining symbols of the subframe are either downlink (if subframe 6 is a downlink subframe) or a combination of downlink symbols, guard time, and uplink symbols if the subframe is a special subframe. Similar to FIG. 3c, the diagonal lines in symbols 0, 1, 2, 3 of slot 1 represent the location where the PBCH occupies for subframe 0. The PBCH is not transmitted in subframe 5 in Release-11 of the 3GPP LTE standards. It is noted that the PSS, SSS, and CRS can be viewed as overhead. The information contents of the PBCH (i.e., the master information block) can change every 40 ms.

Figure 3E:
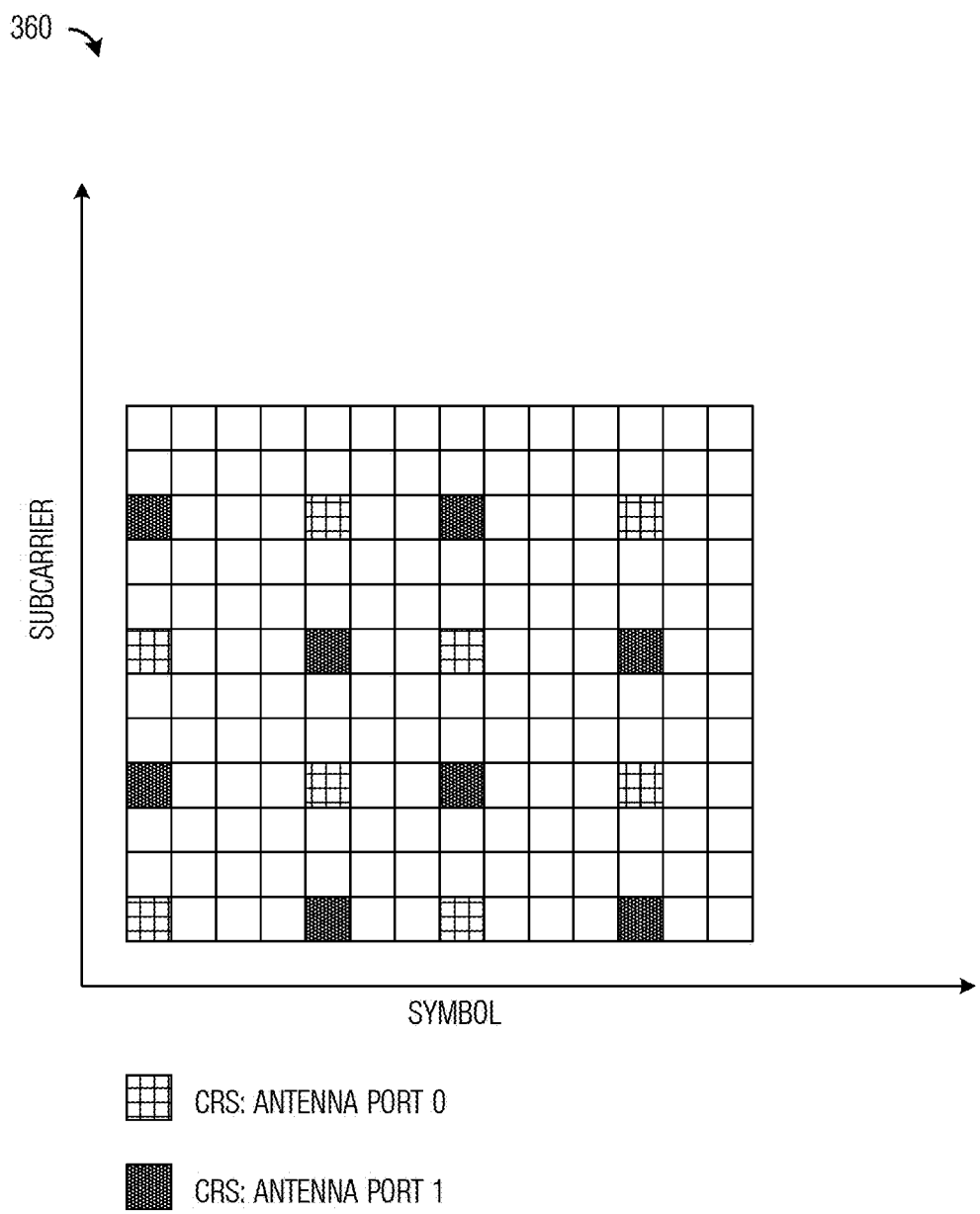
FIG. 3e illustrates an example subframe highlighting a CRS according to example embodiments described herein.

FIG. 3e illustrates an example subframe 360 highlighting a CRS. In downlink transmissions of 3GPP LTE-Advanced (LTE-A) communications systems, there is reference signal for UE to use to perform channel estimation for demodulation of PDCCH and other common channels as well as for measurement and some feedbacks. The reference signal is the CRS inherited from the Release-8/9 of the specification of E-UTRA, as shown in subframe 360. Dedicated/demodulation reference signal (DMRS) may be transmitted together with the PDSCH channel in Release-10 of E-UTRA. The DMRS is used for channel estimation during PDSCH demodulation. The DMRS may also be transmitted together with the enhanced PDCCH (EPDCCH) for the channel estimation of EPDCCH by the UE. The notation (E)PDCCH indicates EPDCCH and/or PDCCH.

Figure 3F:
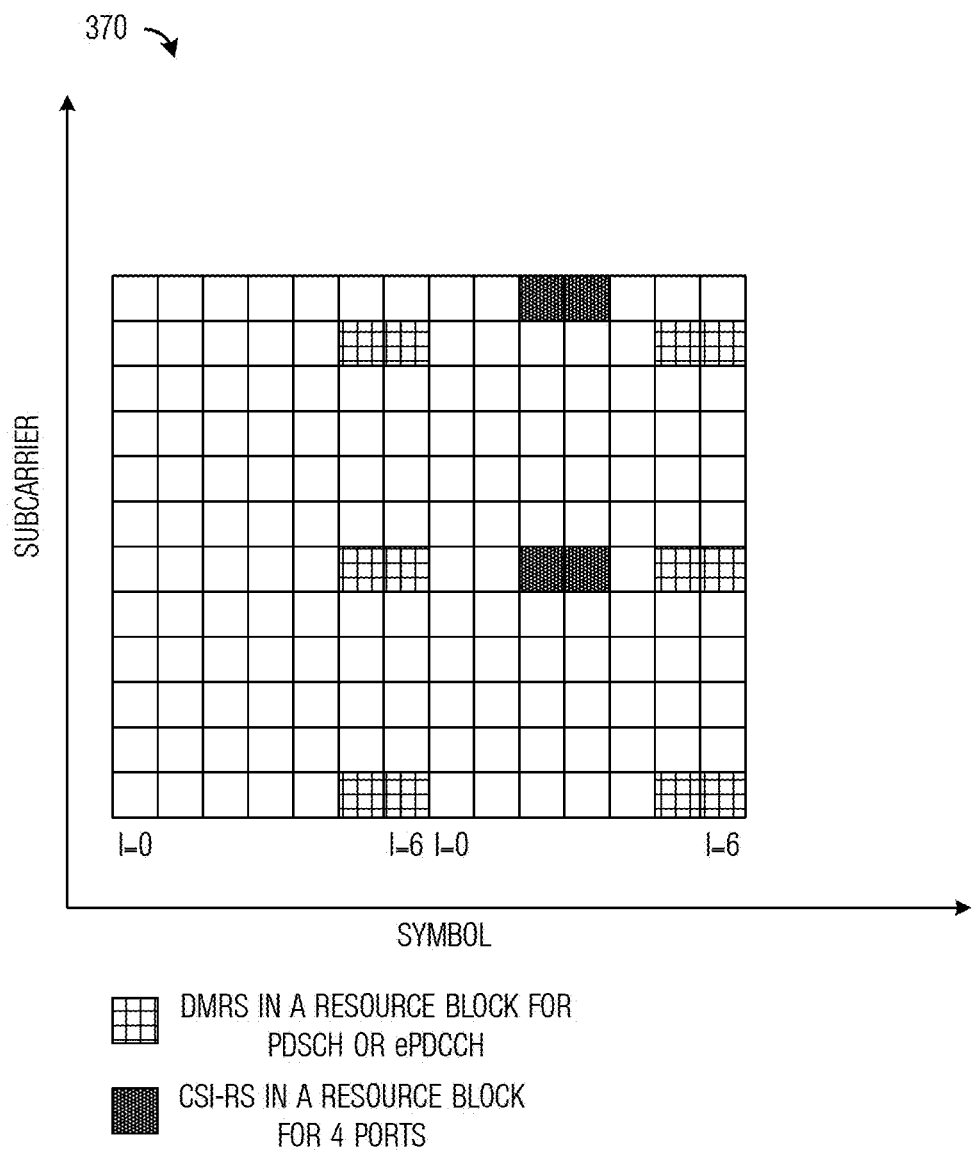
FIG. 3f illustrates an example subframe highlighting a CSI-RS according to example embodiments described herein.

FIG. 3f illustrates an example subframe 370 highlighting a CSI-RS. In Release-10, a channel status indicator reference signal (CSI-RS) is introduced in addition to the CRS and the DMRS, as shown in subframe 370. The CSI-RS may used for Release-10 UEs to measure the channel status, especially for multiple antennas cases. PMI/CQI/RI and other feedback may be based on the measurement of CSI-RS for Rel-10 and beyond UE. PMI is the "precoding matrix indicator", CQI is the "channel quality indicator", and RI is the "rank indicator" of the precoding matrix. There may be multiple CSI-RS resources configured for a UE to use. There is a specific time-frequency resource and a scrambling code assigned by an eNB for each CSI-RS resource.

Figure 3G:
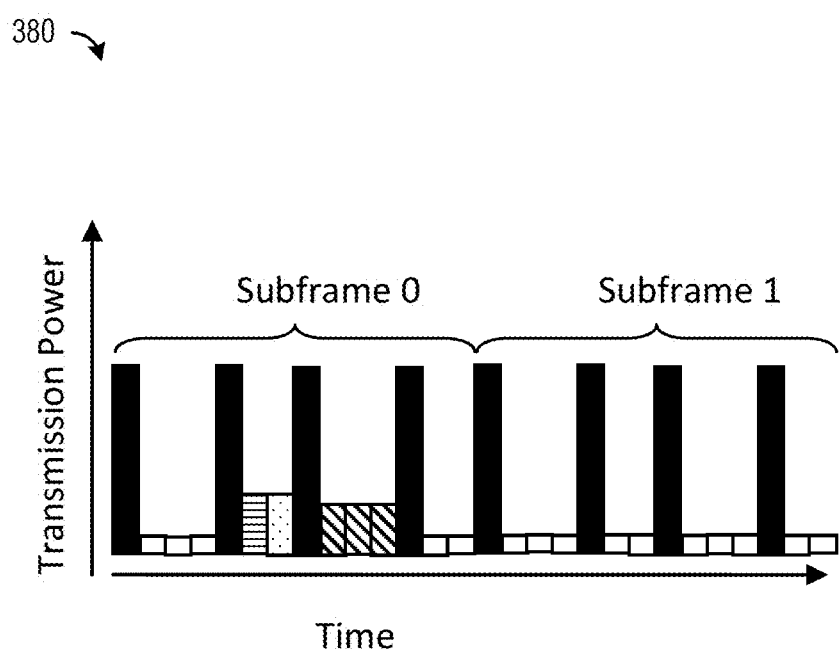
FIG. 3g illustrates an example data plot of the transmission power from an eNB for a FDD configuration for subframes 0 and 1 according to example embodiments described herein.

FIG. 3g illustrates an example data plot 380 of the transmission power from an eNB for a FDD configuration for subframes 0 and 1. Data plot 380 shows that the communication controller still transmits signals such as the CRS (solid shading), the SSS (horizontal crosshatching), the PSS (dotted crosshatching), and the PBCH (diagonal crosshatching) even when there is no other data to transmit on the downlink. The transmission of these signals can increase the interference observed in a system such as in FIG. 2b even when communications controller 205 is not serving a UE such as UE 202. The interference can reduce the system capacity.

Figure 4:
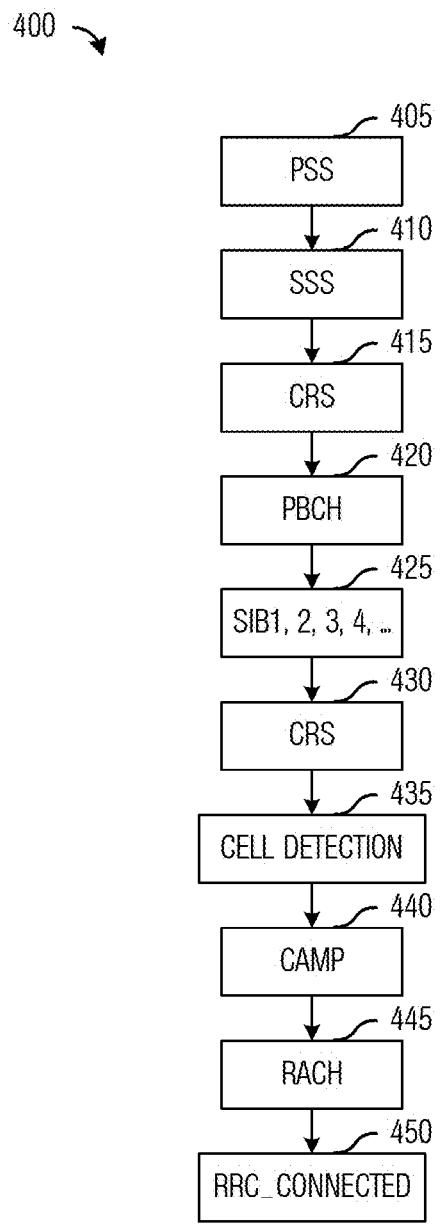
FIG. 4 illustrates a flow diagram of example operations occurring in a UE using signals to synchronize and make measurements according to example embodiments described herein.

However, eliminating these signals entirely can impair system operation. For example, a wireless device relies on these signals to synchronize (both time and frequency) and then make measurements. FIG. 4 illustrates a flow diagram of example operations 400 occurring in a UE using signals to synchronize and make measurements. The UE detects the transmitted PSS in block 405. The UE may detect the SSS in block 410. Having both the PSS and SSS provides the UE with information such as: 1) frame configuration (FDD or TDD); 2) cyclic prefix used for certain downlink subframes; 3) the cell id; and 4) the location of subframe 0. In addition, the UE can perform coarse frequency and timing synchronization using the PSS and SSS.

Since the UE knows the cell id, cyclic prefix, and the location of subframe 0, the UE may make measurements on the CRS in subframes 0 and 5 as shown in block 415. Example measurements may include the reference signal received power (RSRP), the received signal strength indicator (RSSI), and the reference signal received quality (RSRQ). The CRS can be used to improve frequency and timing synchronization. If the measurements indicate that the communications controller is satisfactory (in terms of received signal quality), the wireless device may choose to process the PBCH to determine other information such as the number of antenna ports over which the CRS is transmitted, the frame numbering (e.g., 0 to 1023), and the downlink bandwidth (bandwidth of the downlink carrier) as shown in block 420.

The remaining blocks of operations 400 illustrate how the UE can become assigned to an eNB. In block 425, the UE listens to system information broadcast (SIB) messages, such as SIB1, SIB2, and the like. To listen to SIB messages, the UE typically receives the PDCCH to process the downlink control information (DCI) to obtain the modulation, coding, etc. information for the PDSCH carrying the SIB message. In block 430, the UE may process more CRS for measurement purposes. In block 435, the UE may compare cells in one or more carriers and select a suitable one. In block 440, the UE may decide to camp on this carrier. In block 445, the UE may begin the random access procedure by transmitting the random access channel (RACH) on the uplink in order to enter the RRC_CONNECTED state in block 450. There may be a message exchange in block 450 between the UE and eNB. UEs may have two states: RRC_CONNECTED and RRC_IDLE; the term "connected" can represent RRC_CONNECTED while "idle" can represent RRC_IDLE. RRC is the abbreviation for radio resource control.

One way to reduce interference from eNBs when the eNBs do not have any UEs attached (assigned, camped) is to turn those eNBs off. When UEs arrive, the eNBs may then be turned on. Likewise, when there is no traffic, the eNBs could be turned off. It is understood that there are various ways to support the on-off mechanism of eNBs (on/off adaptation), such as the UE identifying the quality of an eNB based on the persistent transmission of signals such as the PSS, SSS, and CRS; when those signals are absent, how can the UE measure the quality of the eNB. Other issues regarding small cell on/off adaptation, or more generally, network adaptation, include converge and idle UE issues. The coverage issue relates to ensuring cellular coverage despite of small cell on/off. The idle UE issue relates to determining if the small cell operating on/off support UEs in the idle state, what needs to be done to support the idle UEs, in the connected state can the UE and the eNB exchange data. Other implementation issues related to legacy UE support (how to support UEs that do not have this feature), and how to support UE devices that do not have this feature. Additionally, there are issues related to how can fast on/off adaptation be supported. Specifically, how can fast on/off adaptation be supported, given newly introduced procedures/mechanisms (in Release-11/12 or beyond) such as small cell discovery and measurement enhancements; dual connectivity or more broadly, multi-stream aggregation (MSA); CoMP and enhanced CoMP (eCoMP) (including CoMP Scenario 4, where a network with low power RRHs within the macrocell coverage area where the transmission/reception points created by the RRHs have the same cell IDs as the macro cell, coordination over non-ideal backhaul); massive carrier aggregation; and other introduced procedures/mechanisms.

A small cell that frequently (e.g., in time scale shorter than hours) performs on/off adaptation or power adaptation may not be suitable to support idle UEs because rapid adaptation can cause idle UEs to repeatedly enter cell reselection, leading to increased power consumption. Similarly, the small cells may not be suitable for coverage support that a macro cell would be able to provide. Therefore, a small cell may be mainly used to support active UEs' high traffic demand in addition to the basic functionalities provided by the coverage layer. The cells on the coverage layer may not perform on/off adaptation (at least they should not do so frequently). Idle UEs may be connected to coverage layer cells only. A consequence of this is that small cells do not have to be standalone cells at least from the perspective of legacy UEs. In certain isolated local areas, however, there may exist some scenarios where coverage is not a concern and high capacity is desirable; in such situations, standalone small cells performing on/off adaptation may be deployed.

Therefore, typical deployment scenarios include a coverage layer whose cells do not perform network adaptation (or at least not too frequently or significantly), and a capacity layer whose cells (mainly small cells) may perform network adaptation. Coverage/mobility and idle UE support are mainly provided by the coverage layer. Typically UEs connect to cells in the coverage layer first, and then connect to small cells in the capacity layer as needed. The small cells may be co-channel or non-co-channel with those in the coverage layer. An example deployment is shown in FIG. 2b.

According to an example embodiment, a virtual cell configuration (e.g., CoMP Scenario 4) is adopted as an efficient way to deploy and operate the small cells, and the small cells are configured and turned on opportunistically for UEs with high traffic demand. Thus, in such a network, coverage and idle UE support is ensured and not affected by small cell adaptation.

The mechanism of dynamic on/off adaptation of a small cell may be seen as being beneficial when the further evolution of the small cell networks is envisioned. Specifically, to handle the ever increasing needs in data capacity, while meeting customer quality of service (QoS) expectations and operators' requirements for cost-effective service delivery, the densification of a small cell network is proposed. Roughly speaking, doubling the density of the small cell network can yield doubling of the capacity of the network. However, densification leads to higher interference, especially the interference caused by common channels (e.g., CRS) which are persistently transmitted. Turning off the small cell opportunistically can significantly help reduce interference and improve efficiency of the dense network.

In conjunction with increasing network resources by densifying the network, another way to increase the availability of network resources is to utilize more usable spectrum resources, which include not only the licensed spectrum resources of the same type as used by the macro cells, but also the licensed spectrum resources of a different type as those used by the macro cells (e.g., the macro cell is a FDD cell but a small cell may use both FDD and TDD carriers), as well as unlicensed spectrum resources and shared spectrums resources. Generally, the unlicensed spectrums can be used by any user, subject to regulation requirements imposed thereon. Traditionally, the unlicensed spectrums are not used by cellular networks as it is generally difficult to ensure QoS requirements. Communications systems operating in the unlicensed spectrums include wireless local area networks (WLAN), e.g., the IEEE 802.11 (Wi-Fi) networks. However, due to the fact that the licensed spectrum is usually scarce and expensive, utilizing the unlicensed spectrum by the cellular operator may be considered. To meet the regulatory requirements of operating in the unlicensed spectrum and to co-exist with other radio access technologies (RATs) such as Wi-Fi, the transmissions on the unlicensed spectrum may not be continuous or persistent. Rather, on/off transmissions (or opportunistic transmissions and measurements), usually on demand may be adopted. A 3GPP LTE compliant communication system that can also make use of unlicensed spectrum may be referred to as unlicensed LTE (U-LTE), LTE-unlicensed (LTE-U), or as a Licensed-Assisted Access to Unlicensed Spectrum in LTE (LAA or LAA-LTE) communications system. Both unlicensed and licensed spectrum have bands, and within each band there may be one or more carriers.

Thus, it may be seen that when considering the further evolution of the small cell networks, the scenarios may include small cell networks with abundant resources in both node-density dimension and spectrum dimension. Such scenarios may be referred to as hot areas, which indicate enlarged coverage areas when compared to hot spots. Such hot areas are generally deployed and controlled by the network operators. For operation in the hot areas, discontinuous, opportunistic, and/or on-demand transmissions (and reception) and measurements (of signals and/or various types of interference) on flexibly selected resources are needed.

In accordance with an example embodiment, a framework of methods/designs suitable for hot areas, which allow for operations in licensed and/or unlicensed spectrum, is provided. That is, the designs may be spectrum agnostic. Spectrum agnostic designs have certain advantages. If, instead, the main design framework is to customize the designs for different spectrums, then separate designs will definitely occur in order to support different spectrum and the designs will grow further and further apart as time goes, making the specifications, implementation, and operation more complex. Therefore, a unified framework over two or more separate frameworks for licensed and unlicensed may be desired. The unified framework is also feasible, since the main issues and hence main features for dense cellular operations and U-LTE or LAA operations share many commonalities, such as interference issues, non-existence of persistent DL RS (e.g., CRS), and the like. In essence, a communication system may be boiled down into several building blocks for features/functionalities, e.g., measurements, access schemes, link adaptation, and the like. Each building block may be further distilled into smaller blocks. At a lower level, the operations for licensed and unlicensed spectrums are similar. Once these building blocks are well defined, configuration signaling can be used to specify how the interconnected system may work in different types of spectrums. If certain branching-off is needed, it can be at suitable levels and the branches can be selected by network configuration signaling.

The desirable high-level features include adaptation, intra-RAT coordination, and inter-RAT co-existence. More specifically, they may be realized by means of load balancing/shifting, power control/adaptation, other interference coordination/avoidance such as probing. To enable these high-level features, the following embodiments may be adopted.

Figure 5:
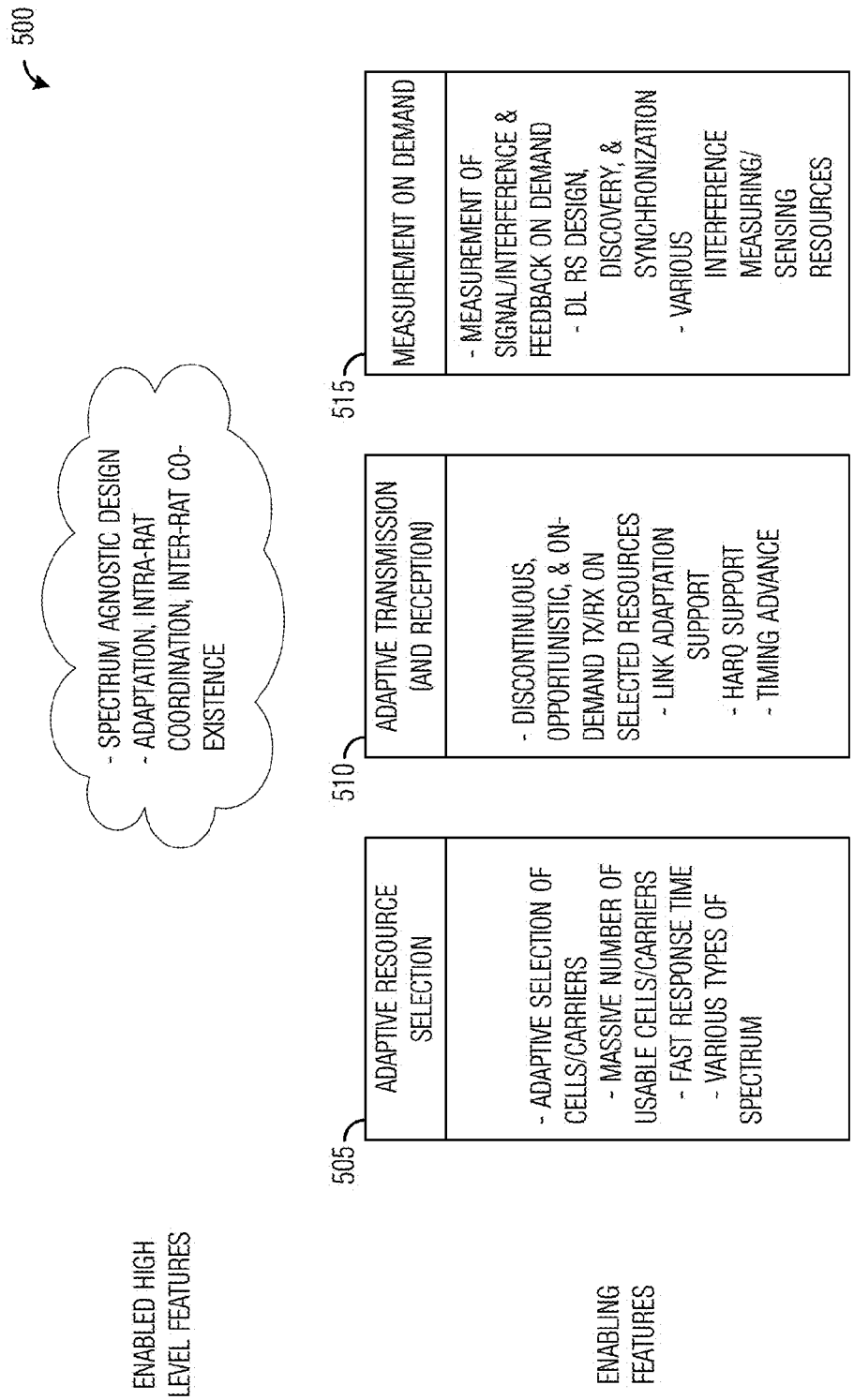
FIG. 5 illustrates a high-level view of an example framework for hot areas that allow for operations in licensed and/or unlicensed spectrum according to example embodiments described herein.

FIG. 5 illustrates a high-level view of an example framework 500 for hot areas that allow for operations in licensed and/or unlicensed spectrum. Framework 500 specifies a spectrum agnostic design that supports adaptation, intra-rat coordination, as well as inter-rat co-existence. Features of framework 500 include adaptive resource selection 505, adaptive transmission and reception 510, and measurement on demand 515. Adaptive resource selection 505 may include adaptive selection of cells and/or carriers, provide a massive number of usable cells and/or carriers, a fast response time, various types of spectrum, and the like. Adaptive transmission and reception 510 may include discontinuous, opportunistic, and on demand transmissions and/or reception on selected resources, and provide functionality such as link adaptation support, HARQ support, timing advance support, and the like, on those resources. Measurement on demand 515 may include measurement of signal and/or interference and feedback on demand, including downlink reference signal (RS) design, discovery and synchronization, as well as various interference measuring and/or sensing resources. Detailed discussions of adaptive resource selection 505, adaptive transmission and reception 510, and measurement on demand 515 are provided below.

In accordance with an example embodiment, adaptive resource selection is provided. In other words, the network may adaptively select a subset of cell and/or carrier resources to be used for a UE. As there are more node resources and spectrum resources to be included in the network, from the UE perspective, it can discover multiple "cells" (a licensed component carrier, or CC, is generally viewed as a cell according to carrier aggregation; other nodes or carriers may be viewed as virtual cells or generalized cells with virtual cell IDs which may or may not be related to physical cell IDs). These cells may be configured for the UE (in slow time scale, for example), but not all may be used. The network selects a subset of the cells and signals information regarding the subset to the UE (e.g., via RRC or medium access control (MAC) signaling, or via physical layer signaling for fast response). If a cell is not selected for any UE, it may be turned off and transmit only in a discovery burst (discovery RS burst, or DRS burst). If a cell is selected, the cell may need to be on or turned on. The transition time may be as short as possible. In one example embodiment, the bandwidth of a cell is not predetermined, but determined when it is selected for use or determined "on the fly" of the transmissions. As an illustrative example, the cell and/or the UE may sense the usage of the spectrum and then decide on a portion of the spectrum which is less occupied by other devices or transmissions.

In accordance with an example embodiment, methods for adaptive transmission and reception are provided. On the selected resources, discontinuous, opportunistic, and/or on-demand transmissions and receptions may occur. To enable such transmissions, example embodiments of link adaptation, hybrid automatic repeat request (HARQ), timing advance, power control, and the like, are provided.

In accordance with an example embodiment, methods for measurements and reporting on demand are provided. The measurements include signal measurements and measurements of various types of interference. Without the persistently transmitted CRS and in order to support opportunistic transmissions, the redesigning of measurement mechanisms, discovery, and synchronization need to be performed. Various types of interference measurement resources (IMRs) or interference sensing resources may need to be configured, with different types of IMRs suitable for different types of interference, such as intra-system (within the network controlled by the same cellular operator) interference, intra-RAT (for networks controlled by different cellular operators) interference, inter-RAT (e.g., between U-LTE and Wi-Fi), and the like.

Figure 6:
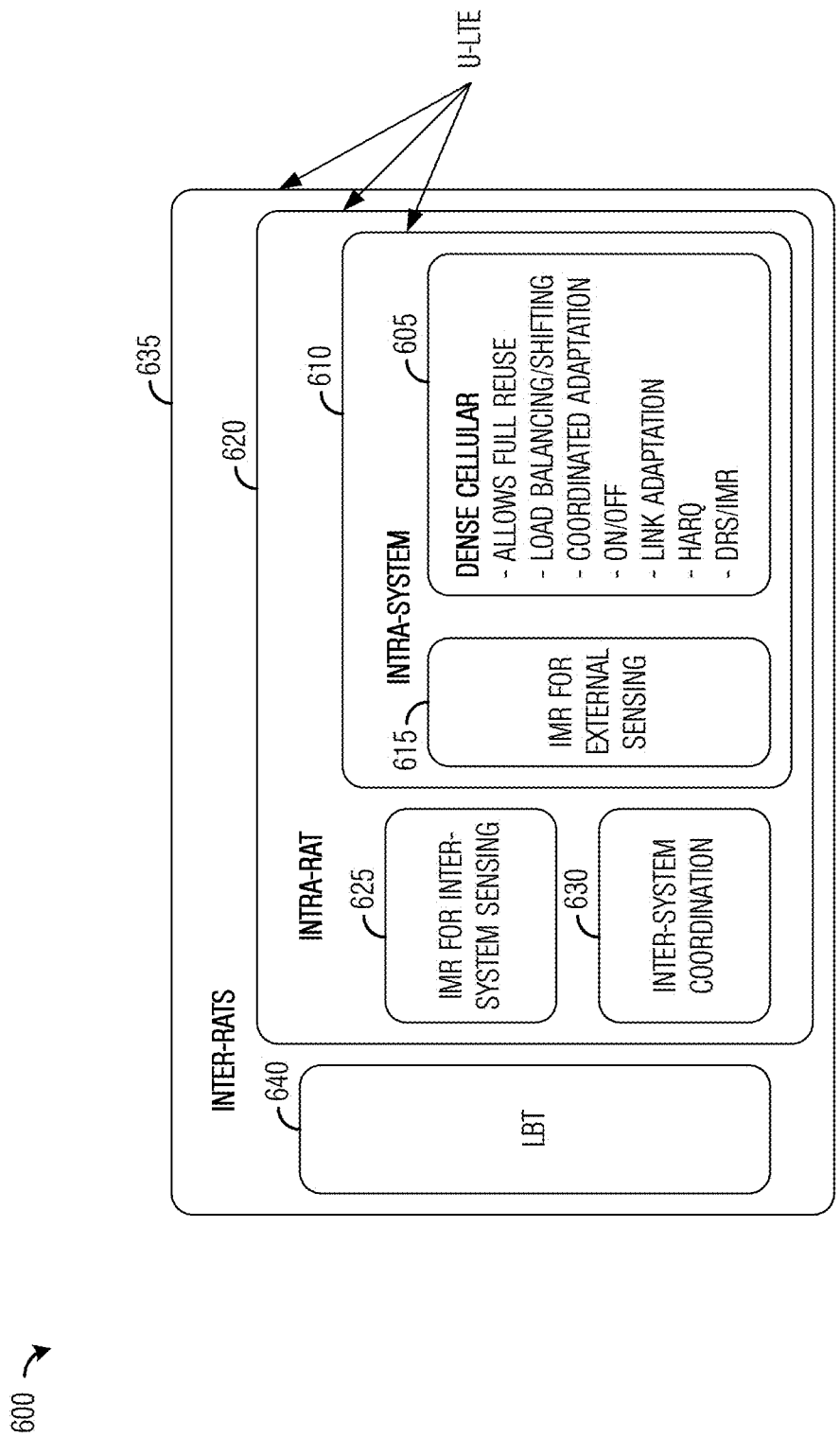
FIG. 6 illustrates an example framework wherein design features for one scenario may be a subset of another scenario according to example embodiments described herein.

FIG. 6 illustrates an example framework 600 wherein design features for one scenario may be a subset of another scenario. If all the features are included and designed for a network, then the network may adjust its configuration for the scenario, by selecting and combining included features, tweaking the parameters, and the like. It can be seen that the core features are those designed for dense cellular (block 605), which are more advantageous than Wi-Fi designs under heavy traffic load and should be preserved for U-LTE or LAA if possible. Features of dense cellular may include: full frequency reuse, load balancing and shifting, coordinated adaptation, on/off operation, link adaptation, hybrid automatic repeat request (HARQ), DRS/IMR, and the like. When U-LTE or LAA is used, within the same system (i.e. intra-system (block 610)) that is controlled by an operator, the main additional feature is the embodiment method of sensing external interference (i.e., non-U-LTE interference, typically interference from the Wi-Fi system) based on new designs of IMR (block 615). In intra-system situations involving U-LTE or LAA, operations are similar to normal cellular systems (e.g., LTE only system), for example, no listen-before-transmission (or listen-before-talk (LBT)) is needed. For the intra-RAT case (block 620), all features in the intra-system case can be used for intra-system operations, with the additional IMR for inter-system sensing (block 625), and based on the sensing/measurement results, inter-system coordination in a generally slow or semi-static time scale may be performed (block 630). In the inter-RAT case (block 635), with the co-existence of U-LTE and Wi-Fi, all features in the intra-RAT case can be used for intra-RAT operations, and the additional feature is to support LBT (block 640). Not all dense cellular features can be used for inter-RAT operations, e.g., full reuse, load balancing/shifting, coordination, since these techniques require coordination which is not available in Wi-Fi, and since Wi-Fi lacks interference tolerance capability and mainly relies on interference avoidance. However, other dense cellular features, such as cell on/off, link adaptation, HARQ, discovery/IMR, probing, power control/adaptation, and the like, can also be used for U-LTE inter-RAT operations.

Figure 7:
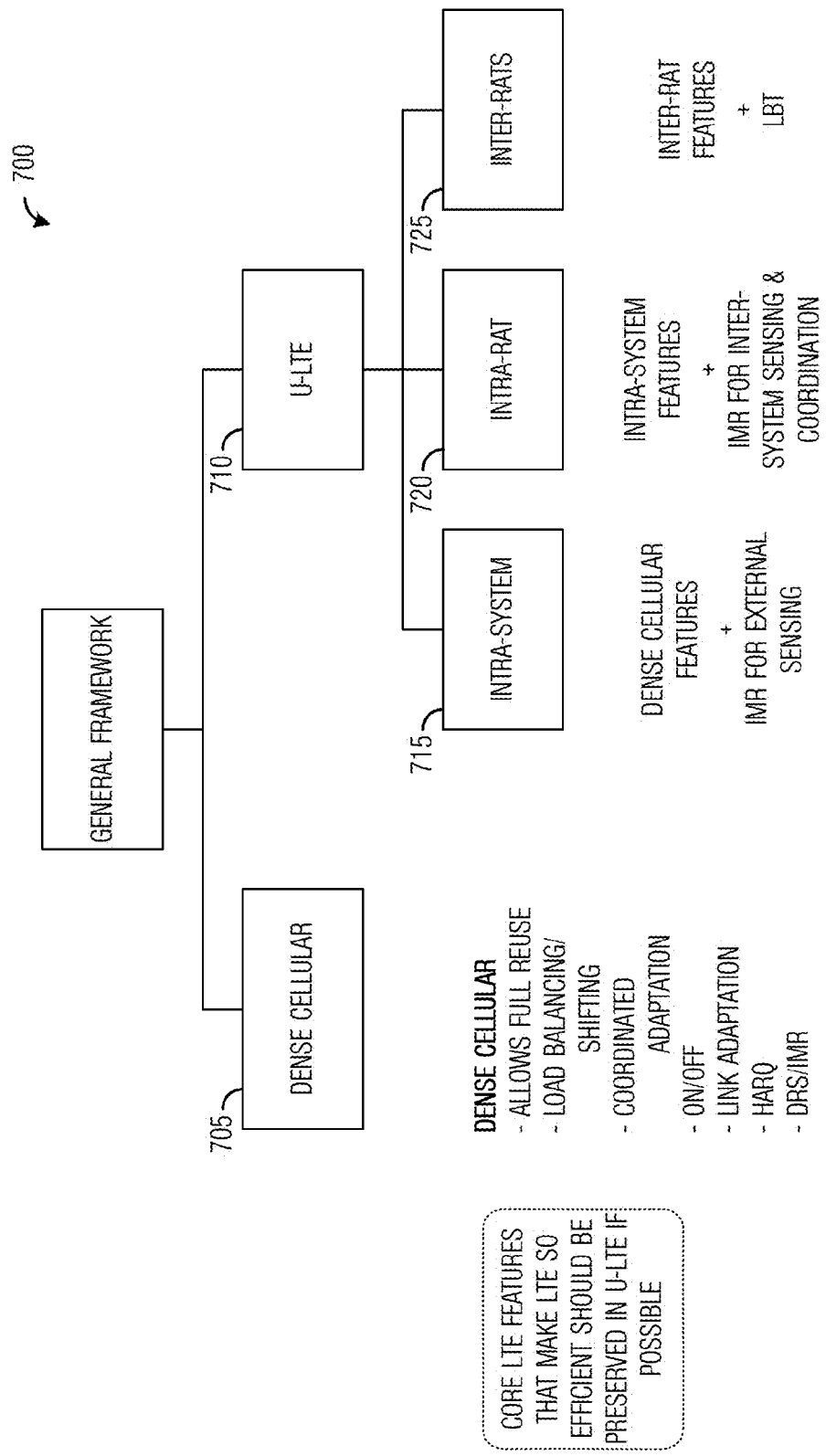
FIG. 7 illustrates a hierarchical view of an example framework wherein design features for one scenario may be a subset of another scenario according to example embodiments described herein.

FIG. 7 illustrates a hierarchical view of an example framework 700 wherein design features for one scenario may be a subset of another scenario. Framework 700 may, in general, include many of the core 3GPP LTE features that make LTE so efficient. Framework 700 includes dense cellular 705 as well as U-LTE (or LAA) 710. Dense cellular 705 may allow for full resource reuse, load balancing and/or load shifting, coordinated adaptation, device on/off, link adaptation, HARQ, DRS and/or IMR, and the like. U-LTE or LAA 710 may apply to intra-systems 715, intra-RAT 720, and inter-RATs 725 configurations. Intra-systems 715 may provide dense cellular features as well as IMR for external sensing. Intra-RAT 720 may include intra-systems features and IMR for inter-system sensing and coordination, while inter-RATs 725 may include inter-RAT features and LBT.

Figure 8:
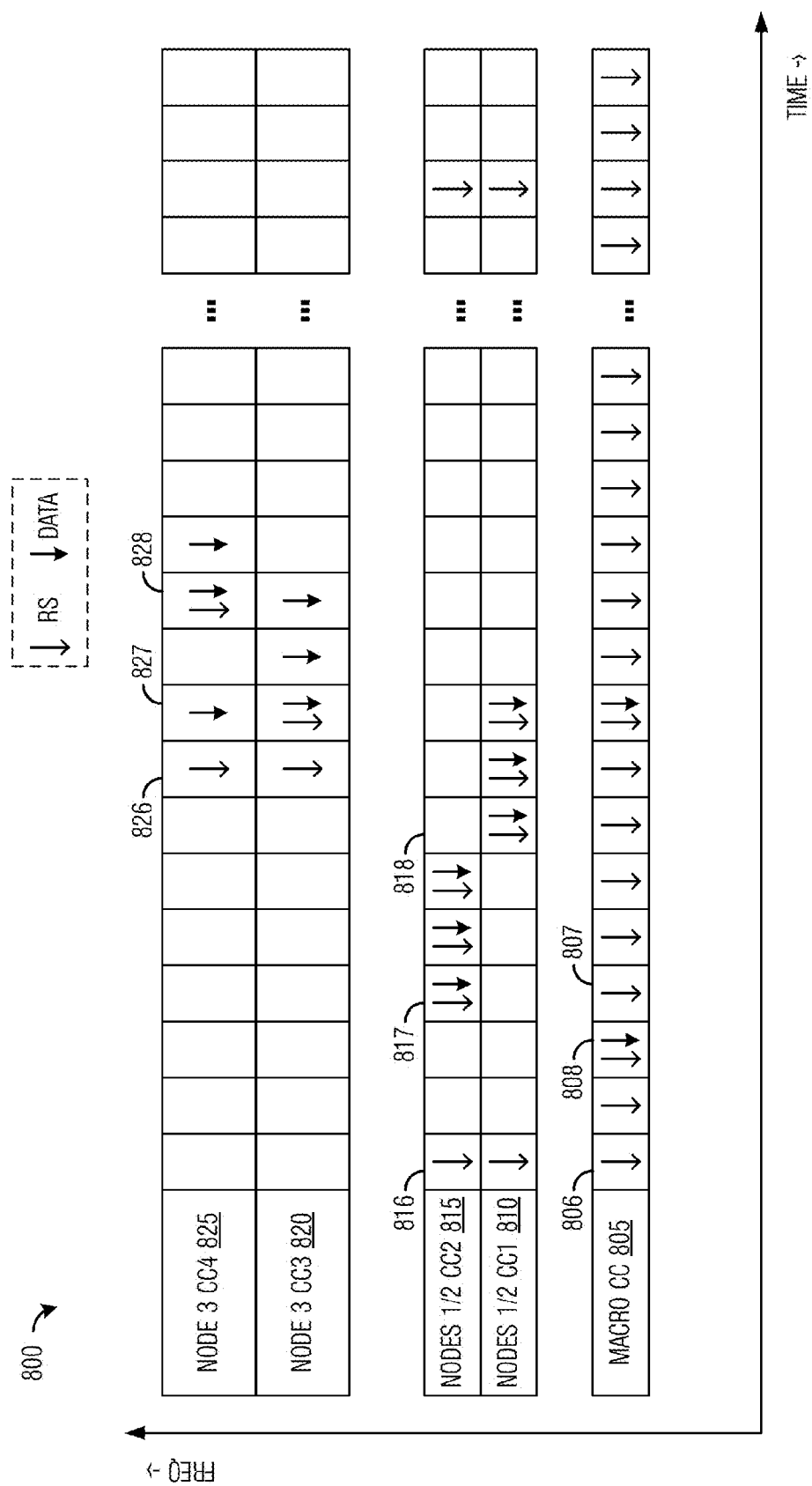
FIG. 8 illustrates a diagram of example network resources used in adaptive resource selection and opportunistic transmission/measurements according to example embodiments described herein.

FIG. 8 illustrates a diagram of example network resources 800 used in adaptive resource selection and opportunistic transmission/measurements. A macro carrier (macro CC 805) normally acts as the Pcell, and does not turn off. It transmits CRS and other common channels regularly (shown as narrow headed arrow in FIG. 8), such as 806 and 807. A UE generally always monitors the macro CC for CRS, common channels, signaling related to other CCs, and possibly data (shown as thick headed arrow in FIG. 8), such as 808. Besides the macro CC, the UE has discovered a number of cells (e.g., by DRS) and some of them may be configured as possible transmission points to the UE. Node1 and node2 may be small cell operating in licensed spectrum, and each may have more than one CC, e.g., CC1 810 and CC2 815. They may be connected via fast backhaul. They may transmit DRS regularly with long duty cycles, such as 816 and 817. They may be turned off in non-DRS bursts unless a measurement/transmission is needed, such as 818. As an illustrative example, the macro CC may indicate that in a next subframe, node 1 and/or node 2 may transmit RS and/or data in CC1 and/or CC2, such as 808 indicating 817. Then the nodes (node 1 and/or node 2) may be turned on at an appropriate time and the UE starts to monitor CC1 and/or CC2 and feedback CSI reports.

Depending on the channel quality, interference coordination purposes, load balancing/shifting, and the like, dynamic point selection (DPS or equivalently dynamic point blanking (DPB)) may be performed. Different from DPS used in Release-11 CoMP, here the RS transmission may be turned off if a cell is not selected, and the RS transmission may be turned on if a cell is selected. The scheduling information may be from the macro CC or any of the cells, but signaling may be sent from a transmitting cell to indicate how the UE may receive the scheduling information, such as in a subset of the cells in the next few subframes, for example. Similarly, a cell may further indicate the UE to monitor cells on unlicensed spectrum (e.g., node 3 CC3 820 and node 3 CC4 825). These cells generally do not use periodic measurements, so aperiodic measurement may be triggered to provide link adaptation capability, such as 826. Usually the measurement may precede a data transmission on the unlicensed cell (such as 826 preceding 827), but they may also be transmitted at the same time when the cell is selected, with possibly higher decoding error probability or with conservative data transmissions until the measurement result is obtained by the network (such as 828).

Figure 9A:
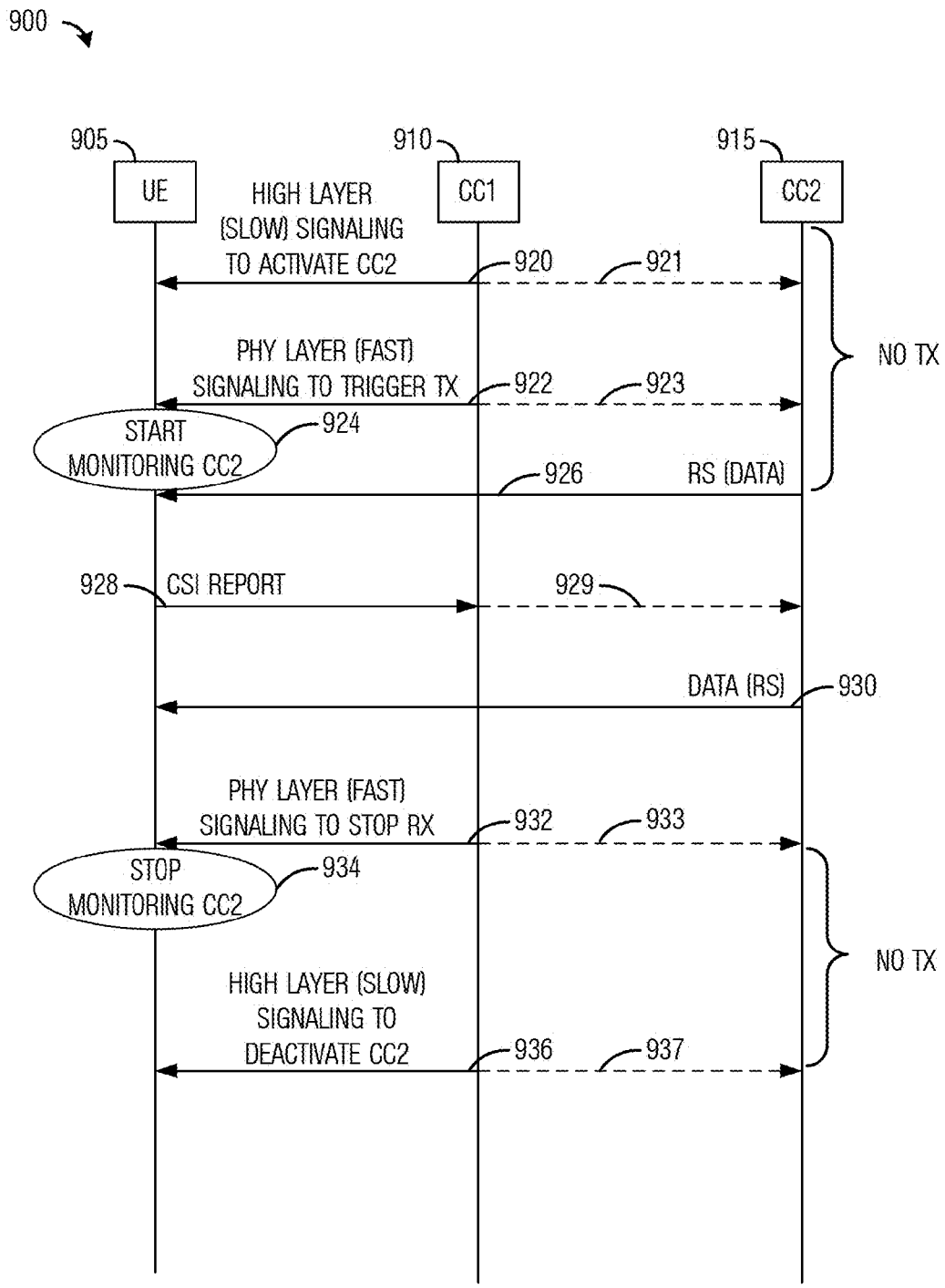
FIG. 9a illustrates a message exchange and processing diagram highlighting a first example design of CSI measurement/feedback on demand for link adaptation in a communications system with a plurality of licensed communications carriers according to example embodiments described herein.

FIG. 9a illustrates a message exchange and processing diagram 900 highlighting a first example design of CSI measurement/feedback on demand for link adaptation in a communications system with a plurality of licensed communications carriers. Message exchange and processing diagram 900 includes messages exchange and processing by a UE 905, a CC1 910, and a CC2 915. In FIG. 9a, CC1 910 may manage a carrier that UE 905 is monitoring as well as a cell associated with the carrier (e.g., CC1 910 may be Pcell or an activated Scell) and CC2 915 is an opportunistically on/off cell and has fast backhaul with CC1 910. CC1 910 and CC2 915 communicate to UE 905 over different licensed communications carriers. Although the discussion focuses on CC1 910 and CC2 915 being separate entities connected via a backhaul, CC1 910 and CC2 915 may also be co-located in a single device.

Since it normally does not communicate continuously, CC2 915 may be in a sleep or reduced power state. CC1 910 may inform UE 905 that it is activating CC2 915 (shown as event 920). As an illustrative example, CC1 910 may activate CC2 915 may perform signaling over the backhaul connecting CC2 915 to CC1 910 (shown as dashed line 921). CC1 910 may also perform high layer signaling (which may be characterized as slow signaling) with UE 905 to inform UE 905 that CC2 915 is being activated. Usually, high layer signaling may be referred to as slow signaling since it involves information sent in downlink control information (DCI) as well as a message encoded in a packet payload, which may take a significant amount of time to transmit and decode.

CC1 may signal a measurement trigger to UE 905 (shown as event 922). The measurement trigger may be signaled using physical layer signaling (which may be characterized as fast signaling), such as in the DCI, for example. Typically, physical layer signaling may be referred to as fast signaling since it involves information sent in the DCI, which may be transmitted and decoded in a short amount of time. CC1 910 may also signal CC2 915 to begin transmitting a RS (shown as dashed line 923). UE 905 may start monitoring CC2 915 (block 924). CC2 915 may start RS (and possibly data) transmission (shown as event 926). UE 905 may measure a communications channel between itself and CC2 915 using the RS. In other words, UE 905 may perform a channel measurement. UE 905 may generate and send a CSI report in accordance with the channel measurement to CC1 910 (shown as event 928). Since CC1 910 and CC2 915 are connected via a backhaul, CC1 910 may signal CC2 915 the CSI report (shown as dashed line 929). CC2 915 may use information included in the CSI report (i.e., information related to the channel measurement) and perform link adaptation. CC2 915 may transmit data (and possibly a RS) to UE 905 (shown as event 930).

CC1 910 signal UE 905 to stop receiving (shown as event 932). The signaling may be performed in the physical layer, therefore, it may be fast signaling. CC1 910 may also signal CC2 915 to stop transmitting (shown as dashed line 933). UE 905 may stop monitoring CC2 915 (block 934). CC1 910 may deactivate CC2 915 by signaling over the backhaul (shown as dashed line 937) and inform UE 905 over high layer signaling regarding the deactivation of CC2 915 (shown as event 936).

Figure 9B:
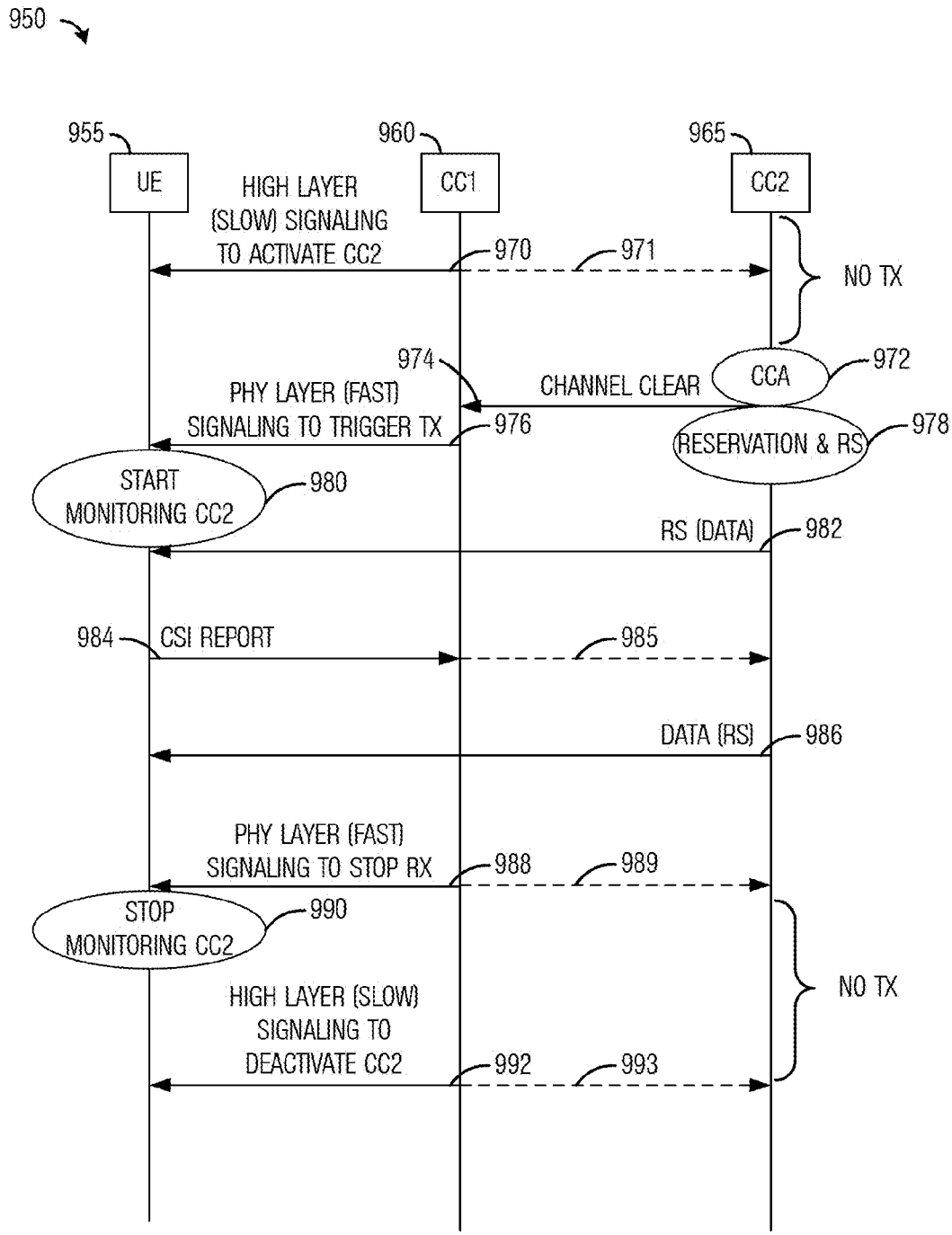
FIG. 9b illustrates a message exchange and processing diagram highlighting a first example design of CSI measurement/feedback on demand for link adaptation in a communications system with at least one unlicensed communications carrier and one licensed communications carrier according to example embodiments described herein.

FIG. 9b illustrates a message exchange and processing diagram 950 highlighting a first example design of CSI measurement/feedback on demand for link adaptation in a communications system with at least one unlicensed communications carrier and one licensed communications carrier. Message exchange and processing diagram 950 includes messages exchange and processing by a UE 955, a CC1 960, and a CC2 965. In FIG. 9b, CC1 960 may be a carrier that UE 955 is monitoring as well as a cell associated with the carrier (e.g., CC1 960 may be Pcell or an activated Scell) and CC2 965 is an opportunistically on/off cell and has fast backhaul with CC1 960. CC1 960 may use a licensed communications carrier, while CC2 965 may use an unlicensed communications carrier. Although the discussion focuses on CC1 960 and CC2 965 being separate entities connected via a backhaul, CC1 960 and CC2 965 may also be co-located in a single device.

Since it normally does not communicate continuously, CC2 965 may be in a sleep or reduced power state. CC1 960 may inform UE 955 that it is activating CC2 965 (shown as event 970). As an illustrative example, CC1 960 may activate CC2 965 may perform signaling over the backhaul connecting CC2 965 to CC1 960 (shown as dashed line 971). CC1 960 may also perform high layer signaling (which may be characterized as slow signaling) with UE 955 to inform UE 955 that CC2 965 is being activated. Since it is operating in the unlicensed communications band, CC2 965 must check to determine if the carrier in that unlicensed band is clear before it can transmit. In other words, CC2 965 performs a CCA (block 972). When CC2 965 determines that the carrier is clear, CC2 965 may signal to CC1 960 that the channel is clear (shown as event 974). The signaling that the channel is clear may be performed over the backhaul between CC2 965 and CC1 960. CC1 960 may signal a measurement trigger to UE 955 (shown as event 976). The measurement trigger may be signaled using physical layer signaling (which may be characterized as fast signaling), such as in the DCI, for example. After determining that the carrier is clear, CC2 965 may reserve the carrier to transmit a RS (block 978). CC2 965 may also start cellular communications, such as transmission of data, using a hybrid automatic repeat request (HARQ) process to manage the transmission of data, and the like.

UE 955 may start monitoring CC2 965 (block 980). CC2 965 may start RS (and possibly data) transmission (shown as event 982). UE 955 may measure a communications channel between itself and CC2 965 using the RS. In other words, UE 955 may perform a channel measurement. UE 955 may generate and send a CSI report in accordance with the channel measurement to CC1 960 (shown as event 984). Since CC1 960 and CC2 965 are connected via a backhaul, CC1 960 may signal CC2 965 the CSI report (shown as dashed line 985). CC2 965 may use information included in the CSI report (i.e., information related to the channel measurement) and perform link adaptation. CC2 965 may transmit data (and possibly a RS) to UE 955 (shown as event 986).

CC1 960 signal UE 955 to stop receiving (shown as event 988). The signaling may be performed in the physical layer, therefore, it may be fast signaling. CC1 960 may also signal CC2 965 to stop transmitting (shown as dashed line 989). UE 955 may stop monitoring CC2 965 (block 990). CC1 960 may deactivate CC2 965 by signaling over the backhaul (shown as dashed line 993) and inform UE 955 over high layer signaling regarding the deactivation of CC2 965 (shown as event 992).

Figure 10A:
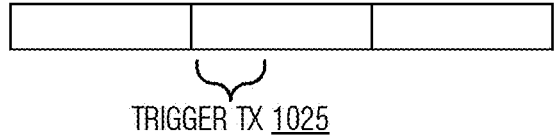
FIG. 10a illustrates subframes highlighting a first example design of CSI measurement/feedback on demand for link adaptation, operating in U-LTE according to example embodiments described herein.
Figure 10A:
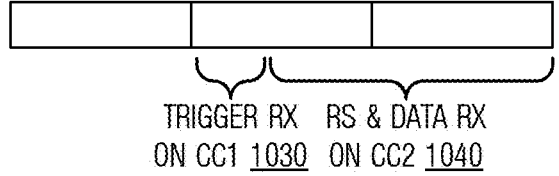
Figure 10A:
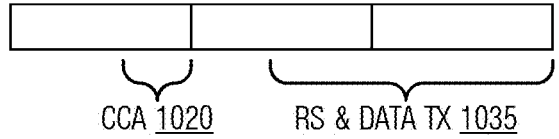

FIG. 10*a* illustrates subframes 1000 highlighting a first example design of CSI measurement/feedback on demand for link adaptation, operating in U-LTE. For discussion purposes, it is assumed that CC1 1005 is a cellular cell that UE 1010 is monitoring, and CC2 1015 is an opportunistically on/off cell operating on unlicensed carrier and has fast backhaul with CC1 1005 (e.g., CC1 1005 and CC2 1015 are co-located). There is generally no DL RS for CSI measurements and reporting sent by CC2 1015 when it is not selected. Besides, CC2 1015 generally cannot transmit until it senses no transmission on that unlicensed carrier for a period of time, i.e., CC2 1015 has to perform a CCA before using the channel.

To support transmission on CC2 1015, CC2 1015 may perform a CCA 1020 in the last few OFDM symbols of a subframe. If the channel is clear, then CC1 1005 may transmit an aperiodic CSI trigger 1025 for CC2 1015; otherwise CC2 1015 may repeat CCAs for a consecutive number of subframes. Generally aperiodic CSI trigger 1025 is transmitted by CC1 1005 in its PDCCH in the subframe following a successful CCA by CC2 1015, and then UE 1010 may detect and decode aperiodic CSI trigger 1030 in at most a few symbol durations. Then starting from symbol x in that subframe which is no earlier than the end of aperiodic CSI trigger 1025, CC2 1015 may start RS transmission 1035. Upon receiving aperiodic CSI trigger 1030, UE 1010 may start monitoring CC2 1015 for RS (and possibly data) 1040. An aperiodic CSI report may be generated and sent to the network (e.g., CC1 1005). With the CSI report, CC2 1010 may perform link adaptation for its transmissions accordingly. According to an example embodiment, CC2 1010 may need to reserve the channel after CCA. CC2 1010 may also perform CCA until the first few symbols of the subframe that aperiodic CSI trigger 1025 is sent, and transmit RS immediately after the CCA. Aperiodic CSI trigger 1025 may be alternatively transmitted in EPDCCH of CC1 1005, which occupies last symbols of a subframe but normally not the first few symbols. In this case the CCA and the EPDCCH containing aperiodic CSI trigger 1025 may be performed in one subframe. Then the RS/data transmission 1035 may start from a subframe after the EPDCCH. To make sure that UE 1010 has sufficient time to detect and decode the EPDCCH and prepare for monitoring CC2 1015, the RS/data transmission should avoid the first few OFDM symbols of that subframe. A CSI-RS may be a suitable candidate for the DL RS. Alternatively, if CRS is to be used, it may be transmitted only in the second slot of a subframe.

It is noted that the RS and possible data transmission may not occur in the first few symbols of a subframe of CC2 1015. In other words, every time CC2 1015 starts transmitting the RS and possibly data, a few symbols may be lost. In such a situation, the starting OFDM symbol of the PDSCH may need to be more flexible. If such opportunistic transmissions occur frequently and each transmission is not long, the overhead may be high.

Figure 10B:
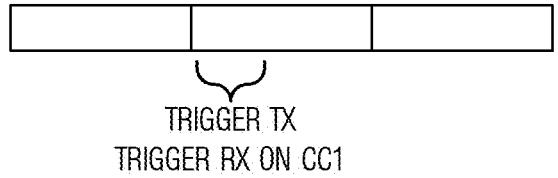
FIG. 10b illustrates subframes highlighting an alternate example design of CSI measurement/feedback on demand for link adaptation, operating in U-LTE according to example embodiments described herein.
Figure 10B:
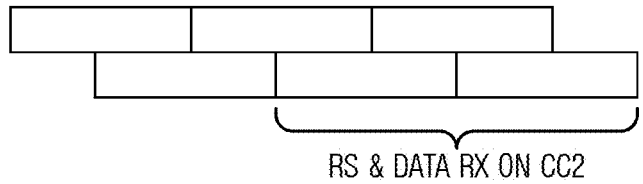
Figure 10B:
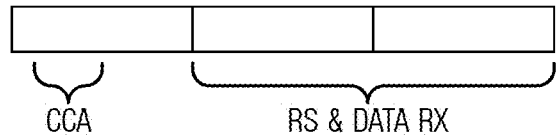

FIG. 10*b* illustrates subframes 1050 highlighting an alternate example design of CSI measurement/feedback on demand for link adaptation, operating in U-LTE. For discussion purposes, it is assumed that CC1 1055 is a cellular cell that UE 1060 is monitoring, and CC2 1065 is an opportunistically on/off cell operating on unlicensed carrier and has fast backhaul with CC1 1055 (e.g., CC1 1055 and CC2 1065 are co-located). In order to reduce overhead, transmissions of RS and possible data by CC2 1065 may be time shifted with respect to CC1 1055. To simplify discussion, the time shift may be a slot in value. However, other time shift values may also be supported. Then RS and possibly data can be sent in a subframe by CC2 1065 immediately after the aperiodic CSI trigger is sent. UE 1060 may receive the aperiodic CSI trigger from CC1 1055 (based on subframe timing of CC1 1055), and UE 1060 starts to buffer the subframe of CC2 1065 immediately after that for RS and possibly data reception. The licensed carriers may have the same subframe boundaries (subject to allowable timing errors), and the unlicensed carriers use the licensed subframe boundaries as reference timing, but with a (possibly common) shift of the subframe boundaries. Therefore, at the cost that the network and UE 1060 maintain multiple (e.g., two) timings (although related), the unlicensed subframes can be fully utilized.

Figure 11A:
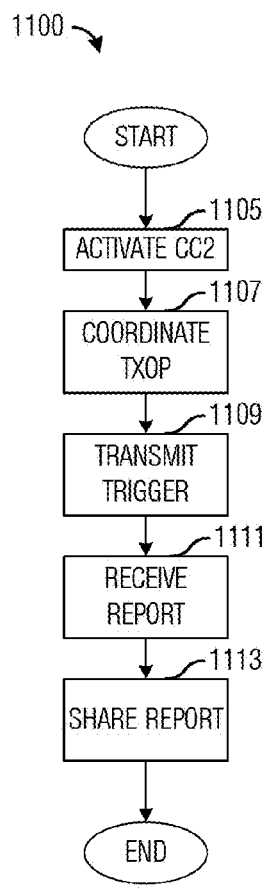
FIG. 11a illustrates a flow diagram of example operations occurring in a cellular cell operating in a licensed carrier highlighting a first example design of CSI measurement/feedback on demand for link adaptation according to example embodiments described herein.

FIG. 11*a* illustrates a flow diagram of example operations 1100 occurring in a cellular cell operating in a licensed carrier highlighting a first example design of CSI measurement/feedback on demand for link adaptation. Operations 1100 may be indicative of operations occurring in a cellular cell, such as CC1 910.

Operations 1100 may begin with the cellular cell, operating in a first carrier (i.e., the licensed carrier) activating operations in a second carrier (i.e., another licensed carrier or an unlicensed carrier) (block 1105). As part of activating operations in the second carrier, the cellular cell may send a higher layer message to the UE to inform the UE that operations in the second carrier (as it relates to the UE) has been activated. The cellular cell may coordinate an opportunistic transmission opportunity (block 1107). The cellular cell may coordinate with the opportunistically on/off cell to arrange the opportunistic transmission opportunity. The cellular cell may generate a physical layer message including an aperiodic CSI trigger and transmit the physical layer message to the UE in the first carrier (block 1109). The physical layer message may serve as an indicator of the opportunistic transmission opportunity. The opportunistic transmission opportunity may be indicated by a Layer 1 indicator. The cellular cell may receive a CSI report from a UE (block 1111). The cellular cell may share the CSI report with the opportunistically on/off cell operating in the unlicensed carrier (block 1113). As an example, the cellular cell may use the fast backhaul between itself and the opportunistically on/off cell.

Figure 11B:
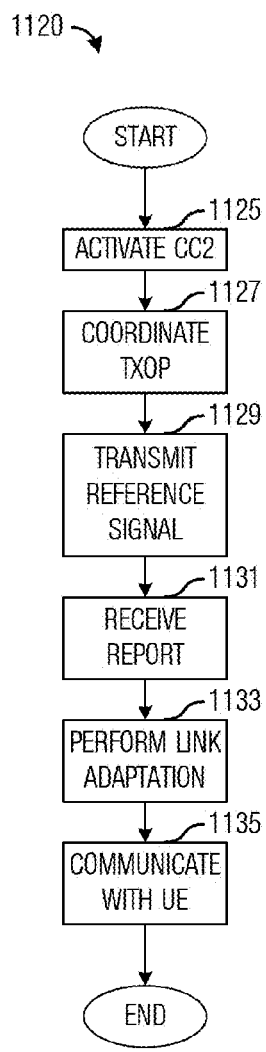
FIG. 11b illustrates a flow diagram of example operations occurring in an opportunistically on/off cell operating in a licensed or an unlicensed carrier highlighting a first example design of CSI measurement/feedback on demand for link adaptation according to example embodiments described herein.

FIG. 11*b* illustrates a flow diagram of example operations 1120 occurring in an opportunistically on/off cell operating in a licensed or an unlicensed carrier highlighting a first example design of CSI measurement/feedback on demand for link adaptation. Operations 1120 may be indicative of operations occurring in an opportunistically on/off cell operating on unlicensed carrier, such as CC2 915.

Operations 1120 may begin with operations for the opportunistically on/off cell being activated in a second carrier (i.e., a licensed carrier (different from that used by the cellular cell, referred to herein as the first carrier) or an unlicensed carrier) as it relates to communications with the UE (block 1125). The opportunistically on/off cell may coordinate with the cellular cell on an opportunistic transmission opportunity (block 1127). The opportunistically on/off cell may transmit a reference signal (RS) to the UE in the second carrier (block 1129). The transmission of the RS may serve as an indicator of the opportunistic transmission opportunity. If the opportunistically on/off cell is operating in an unlicensed band, the opportunistically on/off cell may perform a CCA prior to transmitting the RS to make sure that the second carrier is clear before it transmits. The opportunistically on/off cell may receive a CSI report from the cellular cell, which was received from the UE (block 1131). The CSI report may be received from the cellular cell over the fast backhaul, for example. The opportunistically on/off cell may perform link adaptation using the information included in the CSI report (block 1133). The transmitting of the RS, the receiving of the CSI report, and the performing of the link adaptation may be referred to as participating in a channel measurement procedure. The opportunistically on/off cell may communicate with the UE (block 1135). Communicating with the UE may include the opportunistically on/off cell transmitting to the UE in the second carrier.

Figure 11C:
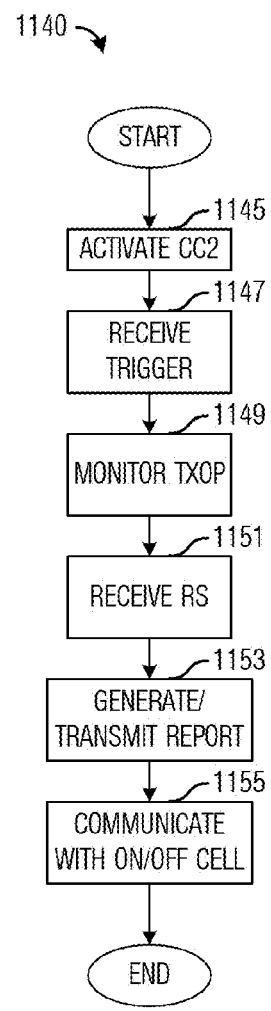
FIG. 11c illustrates a flow diagram of example operations occurring in a UE highlighting a first example design of CSI measurement/feedback on demand for link adaptation according to example embodiments described herein.

FIG. 11*c* illustrates a flow diagram of example operations 1140 occurring in a UE highlighting a first example design of CSI measurement/feedback on demand for link adaptation. Operations 1140 may be indicative of operations occurring in a UE, such as UE 905.

Operations 1140 may begin with the UE receiving a higher layer message from the cellular cell including information regarding the activation of a second carrier (i.e., a licensed carrier (different from that used by the cellular cell, referred to herein as the first carrier) or an unlicensed carrier) for operations with the UE, with the higher layer message being transmitted in the first carrier (block 1145). The UE may receive a physical layer message from the cellular cell that includes an aperiodic CSI trigger (block 1147). The aperiodic CSI trigger may be received from a cellular cell in the first carrier, for example. The aperiodic CSI trigger may include information specifying the second carrier the UE is to measure. The UE may monitor an opportunistic transmission opportunity for a RS transmitted by the opportunistically on/off cell (block 1149). The UE may receive the RS (block 1151) and generate a CSI report and transmit the CSI report (block 1151 1531). The CSI report may be generated in accordance with the received RS. The CSI report may be transmitted to the cellular cell in the first carrier. The reception of the RS may serve as an indicator of the opportunistic transmission opportunity. The receiving of the RS, the generating of the CSI report, and the transmitting of the CSI report may be referred to as participating in a channel measurement procedure. The UE may communicate with the opportunistically on/off cell (block 1155). Communicating with the opportunistically on/off cell may include the UE receiving a transmission from the opportunistically on/off cell.

Figure 12A:
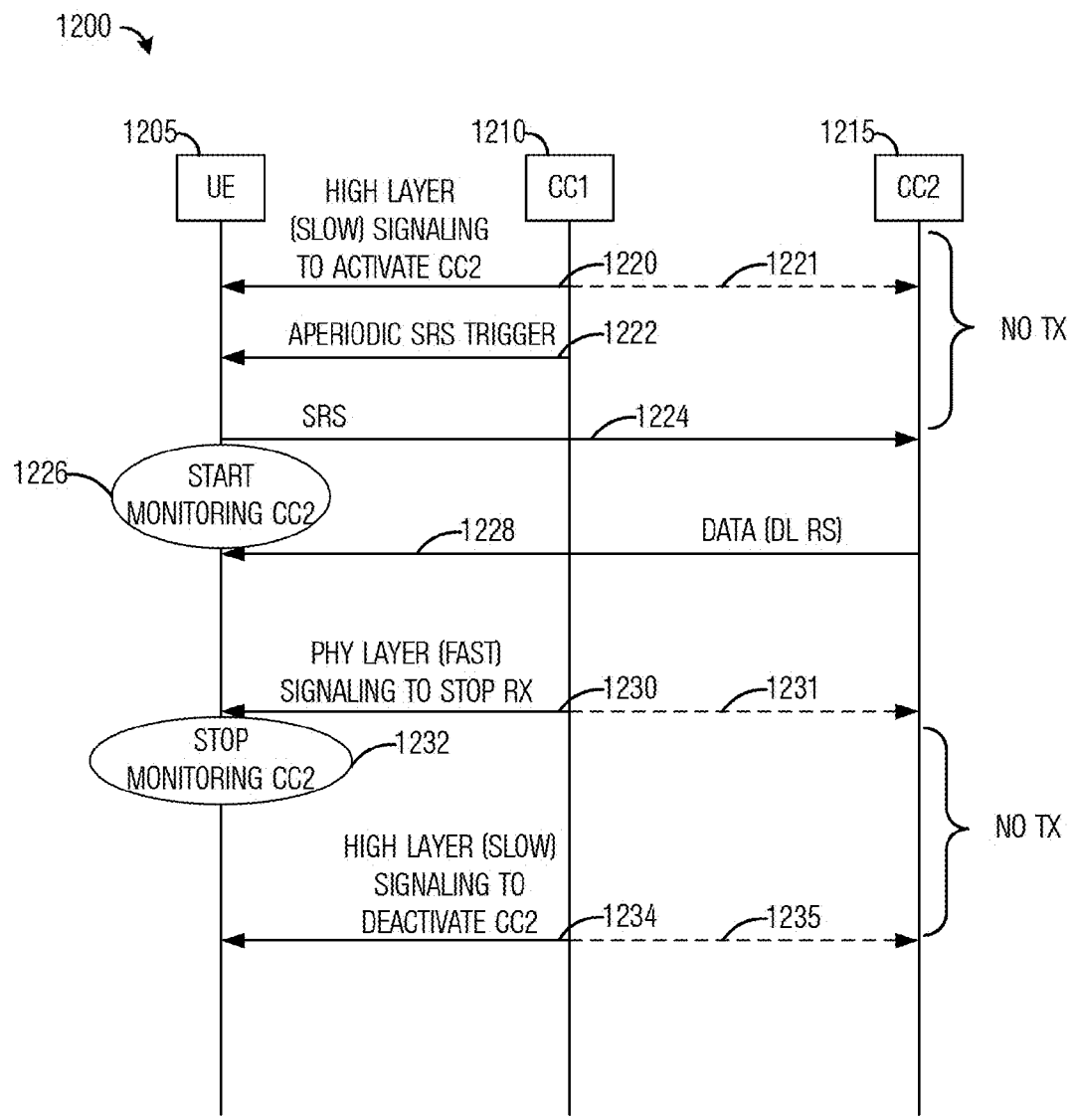
FIG. 12a illustrates a message exchange and processing diagram highlighting a second example design of CSI measurement/feedback on demand for link adaptation, based on aperiodic SRS trigger and UL SRS in a communications system with a plurality of licensed communications carriers according to example embodiments described herein.

FIG. 12*a* illustrates a message exchange and processing diagram 1200 highlighting a second example design of CSI measurement/feedback on demand for link adaptation, based on aperiodic sounding reference signal (SRS) trigger and UL SRS in a communications system with a plurality of licensed communications carriers. Message exchange and processing diagram 1200 includes messages exchange and processing by a UE 1205, a CC1 1210, and a CC2 1215. In FIG. 12*a*, CC1 1210 may manage a carrier that UE 1205 is monitoring as well as a cell associated with the carrier (e.g., CC1 1210 may be Pcell or an activated Scell) and CC2 1215 is an opportunistically on/off cell and has fast backhaul with CC1 1210. CC1 1210 and CC2 1215 communicate over different licensed communications carriers. Although the discussion focuses on CC1 1210 and CC2 1215 being separate entities connected via a backhaul, CC1 1210 and CC2 1215 may also be co-located in a single device.

Since it normally does not communicate continuously, CC2 1215 may be in a sleep or reduced power state. CC1 1210 may inform UE 1205 that it is activating CC2 1215 (shown as event 1220). As an illustrative example, CC1 1210 may activate CC2 1215 may perform signaling over the backhaul connecting CC2 1215 to CC1 1210 (shown as dashed line 1221). CC1 1210 may also perform high layer signaling (which may be characterized as slow signaling) with UE 1205 to inform UE 1205 that CC2 1215 is being activated. CC1 1210 may signal a trigger to UE 1205, e.g., an aperiodic SRS trigger (shown as event 1222). UE 1205 may send a SRS to CC2 1215 in a specified resource(s) specified in the aperiodic SRS trigger (shown as event 1224). UE 1205 may begin monitoring CC2 1215 (block 1226). CC2 1215 may measure a communications channel between itself and UE 1205 using the SRS. In other words, CC2 1215 may perform a channel measurement. CC2 1215 may use the channel measurement to perform link adaptation. CC2 1215 may transmit data (and possibly a DL RS) to UE 1205 (shown as event 1228).

CC1 1210 signal UE 1205 to stop receiving (shown as event 1230). The signaling may be performed in the physical layer, therefore, it may be fast signaling. CC1 1210 may also signal CC2 1215 to stop transmitting (shown as dashed line 1231). UE 1205 may stop monitoring CC2 1215 (block 1232). CC1 1210 may deactivate CC2 1215 by signaling over the backhaul (shown as dashed line 1235) and inform UE 1205 over high layer signaling regarding the deactivation of CC2 1215 (shown as event 1234).

Figure 12B:
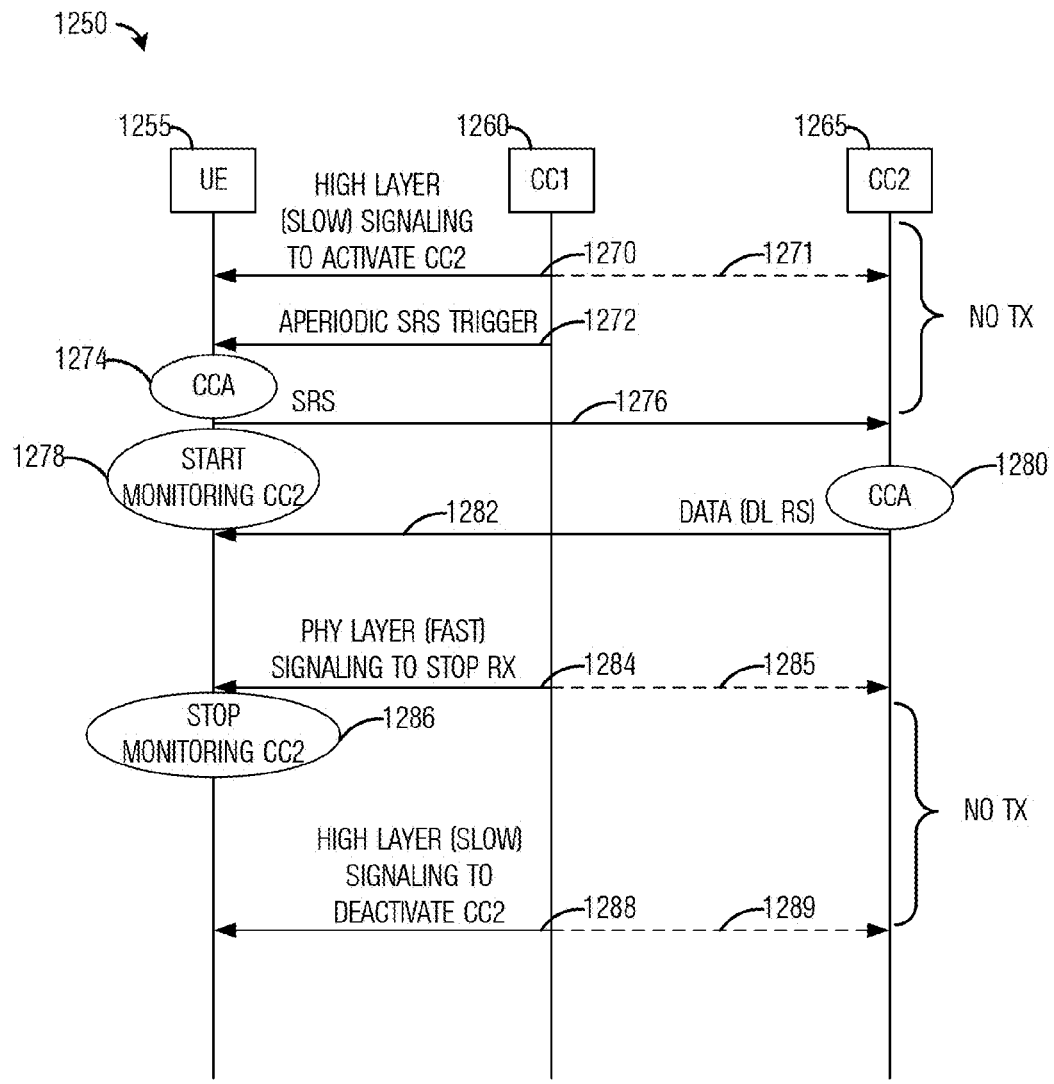
FIG. 12b illustrates a message exchange and processing diagram highlighting a second example design of CSI measurement/feedback on demand for link adaptation, based on aperiodic SRS trigger and UL SRS in a communications system with at least one unlicensed communications carrier and one licensed communications carrier according to example embodiments described herein.

FIG. 12b illustrates a message exchange and processing diagram 1250 highlighting a second example design of CSI measurement/feedback on demand for link adaptation, based on aperiodic SRS trigger and UL SRS in a communications system with at least one unlicensed communications carrier and one licensed communications carrier. Message exchange and processing diagram 1250 includes messages exchange and processing by a UE 1255, a CC1 1260, and a CC2 1265. In FIG. 12b, CC1 1260 may manage a carrier that UE 1255 is monitoring as well as a cell associated with the carrier (e.g., CC1 1260 may be Pcell or an activated Scell) and CC2 1265 is an opportunistically on/off cell and has fast backhaul with CC1 1260. CC1 1260 may use a licensed communications carrier, while CC2 1265 may use an unlicensed communications carrier. Although the discussion focuses on CC1 1260 and CC2 1265 being separate entities connected via a backhaul, CC1 1260 and CC2 1265 may also be co-located in a single device.

Since it normally does not communicate continuously, CC2 1260 may be in a sleep or reduced power state. CC1 1260 may inform UE 1255 that it is activating CC2 1265 (shown as event 1270). As an illustrative example, CC1 1260 may activate CC2 1265 may perform signaling over the backhaul connecting CC2 1265 to CC1 1260 (shown as dashed line 1271). CC1 1260 may also perform high layer signaling (which may be characterized as slow signaling) with UE 1255 to inform UE 1255 that CC2 1265 is being activated. CC1 1260 may signal a trigger to UE 1255, e.g., an aperiodic SRS trigger (shown as event 1272). Since it is operating in the unlicensed communications carrier, UE 1255 must check to determine if the carrier is clear before it can transmit. In other words, UE 1255 performs a CCA (block 1274). When UE 1255 determines that the carrier is clear, UE 1255 may send a SRS to CC2 1265 in a specified resource(s) specified in the aperiodic SRS trigger (shown as event 1276). UE 1255 may begin monitoring CC2 1265 (block 1278). CC2 1265 may measure a communications channel between itself and UE 1255 using the SRS. In other words, CC2 1265 may perform a channel measurement. CC2 1265 may use the channel measurement to perform link adaptation. Since it too is operating in the unlicensed communications band, CC2 1265 must check to determine if the carrier is clear before it can transmit. In other words, CC2 1265 performs a CCA (block 1280). When CC2 1265 determines that the carrier is clear, CC2 1265 may transmit data (and possibly a DL RS) to UE 1255 (shown as event 1282).

CC1 1260 signal UE 1255 to stop receiving (shown as event 1284). The signaling may be performed in the physical layer, therefore, it may be fast signaling. CC1 1260 may also signal CC2 1265 to stop transmitting (shown as dashed line 1285). UE 1255 may stop monitoring CC2 1265 (block 1286). CC1 1260 may deactivate CC2 1265 by signaling over the backhaul (shown as dashed line 1289) and inform UE 1255 over high layer signaling regarding the deactivation of CC2 1265 (shown as event 1288).

If the SRS transmission uses only one antenna of UE 1205 and/or 1255, in order for CC2 1215 and/or 1265 to perform MIMO transmissions in DL, more transmissions may be triggered (such as by a single trigger). However, the interference at UE 1205 and/or 1255 may not be known to the network using this method. The technique shown in FIGS. 12a and 12b may be used in conjunction with other methods that can provide interference measurements to the network, and the network can choose the transmission format based on the SRS and reported interference.

Figure 13:
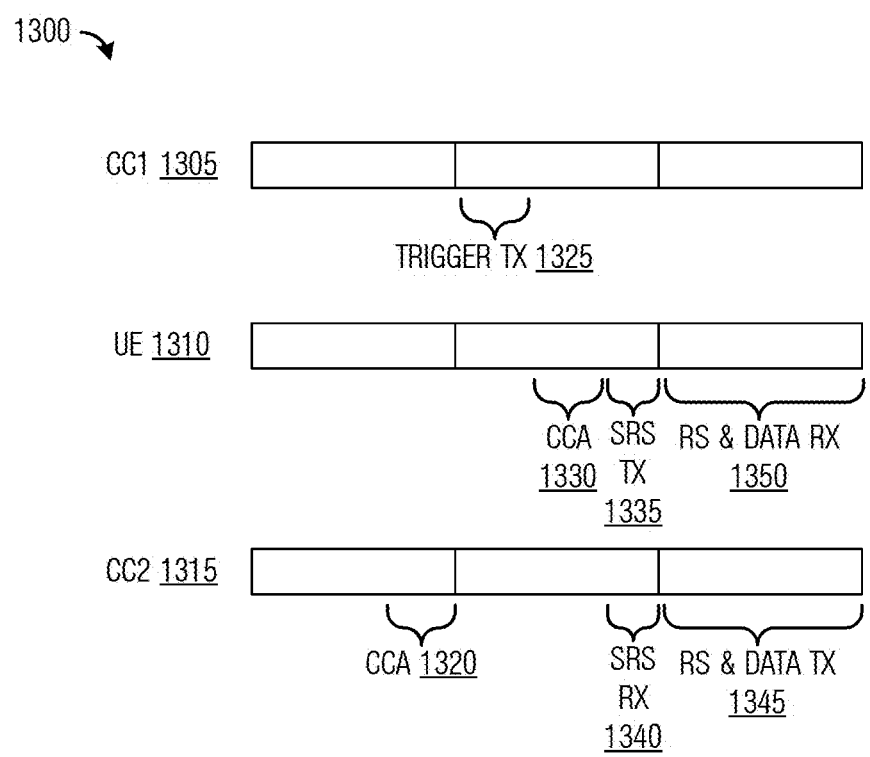
FIG. 13 illustrates subframes highlighting a second example design of CSI measurement/feedback on demand for link adaptation, based on aperiodic SRS trigger and UL SRS according to example embodiments described herein.

FIG. 13 illustrates subframes 1300 highlighting a second example design of CSI measurement/feedback on demand for link adaptation, based on aperiodic SRS trigger and UL SRS. For discussion purposes, it is assumed that CC1 1305 is a cellular cell that UE 1310 is monitoring, and CC2 1315 is an opportunistically on/off cell operating on unlicensed carrier and has fast backhaul with CC1 1305 (e.g., CC1 1305 and CC2 1315 are co-located). Generally the UL transmissions are scheduled by the network (e.g., CC1 1305), and the time/frequency resource to be used by the UL transmission is decided and specified by the network. However, in the unlicensed spectrum, UE 1310 still needs to sense the channel and then decides if it can transmit or not. Several alternative techniques may be adopted to deal with this issue. A first technique is to allow some timing uncertainties in transmitting a scheduled UL, thus allowing UE 1310 to back off a few symbols/slots/subframes before it times out. A second technique is to allow both CC1 1305 and UE 1310 to sense and reserve the channel before the scheduled transmission.

According to an example embodiment, CC2 1315 performs CCA 1320 at the last few symbols of a subframe, deciding if UL and/or DL transmissions are suitable or not. If yes, then CC1 1305 sends SRS trigger 1325 in PDCCH in the next subframe. UE 1310 then performs CCA 1330 upon receiving SRS trigger 1325, and sends SRS 1335 in the last symbol(s) of the subframe (the last part of the subframe may be viewed as UpPTS for SRS transmission). CC2 1315 receives the SRS signal 1340. Then data and/or DL RS 1345 from CC2 1310 may follow in the next subframe. UE 1310 may also treat SRS trigger 1325 as a signaling requesting it to start monitoring CC2 1315 in the next subframe. In another example embodiment, CC2 1315 performs CCA and sends EPDCCH in a subframe, and UE 1310 performs CCA and sends SRS in the next subframe. In another example embodiment, the subframe boundaries of CC2 1315 may be shifted relative to the subframe boundaries of CC1 1305, for example, by one slot.

According to an example embodiment, the RTS/CTS signals are also be transmitted similar to Wi-Fi. However, in U-LTE, the RTS/CTS mechanism needs not be exactly followed. As an illustrative example, even for the UL transmission, CC2 1315 may send RTS, and UE 1310 may reply with CTS or UE 1310 does not need to reply with CTS (just sending the UL without CTS, for example). The signal contents/waveforms may also be altered from RTS/CTS, for example, the SRS may be viewed as a form of CTS in response to a RTS from CC2 1315. The RTS/CTS may also be used for U-LTE to transmit information, for example, the RTS/CTS may include scheduling and transmission information for SRS/CSI. The RTS may also be used to trigger UL transmissions.

FIG. 14a illustrates a flow diagram of example operations 1400 occurring in a cellular cell operating in a licensed carrier highlighting a second example design of CSI measurement/feedback on demand for link adaptation. Operations 1400 may be indicative of operations occurring in a cellular cell, such as CC1 1210.

Operations 1400 may begin with the cellular cell, operating in a first carrier (i.e., the licensed carrier) activating operations in a second carrier (i.e., another licensed carrier or an unlicensed carrier) (block 1405). As part of activating operations in the second carrier, the cellular cell may send a higher layer message to the UE to inform the UE that operations in the second carrier (as it relates to the UE) has been activated. The cellular cell may coordinate an opportunistic transmission opportunity (block 1407). The cellular cell may coordinate with the opportunistically on/off cell to arrange the opportunistic transmission opportunity. The cellular cell may generate a physical layer message including an aperiodic CSI trigger and transmit the physical layer message to the UE in the first carrier (block 1409). The physical layer message may serve as an indicator of the opportunistic transmission opportunity. The physical layer message may be transmitted in a PDCCH transmitted by the cellular cell.

FIG. 14*b* illustrates a flow diagram of example operations 1420 occurring in an opportunistically on/off cell operating in a licensed or an unlicensed carrier highlighting a second example design of CSI measurement/feedback on demand for link adaptation. Operations 1420 may be indicative of operations occurring in an opportunistically on/off cell operating on unlicensed carrier, such as CC2 1215.

Operations 1420 may begin operations for the opportunistically on/off cell being activated in a second carrier (i.e., a licensed carrier (different from that used by the cellular cell, referred to herein as the first carrier) or an unlicensed carrier) as it relates to communications with the UE (block 1425). The opportunistically on/off cell may coordinate with the cellular cell on an opportunistic transmission opportunity (block 1427). The opportunistically on/off cell may receive a RS, such as a SRS (block 1429). The RS may be received from the UE. The opportunistically on/off cell may perform link adaptation in accordance with the SRS (block 1431). The receiving of the RS and the performing the link adaptation may be referred to as participating in a channel measurement procedure. The opportunistically on/off cell may communicate with the UE (block 1433). Communications with the UE may include transmissions of data and possibly DL RS by the opportunistically on/off cell. If the opportunistically on/off cell is operating in an unlicensed band, the opportunistically on/off cell may perform a CCA prior to transmitting to the UE to make sure that the second carrier is clear before it transmits.

FIG. 14*c* illustrates a flow diagram of example operations 1440 occurring in a UE highlighting a second example design of CSI measurement/feedback on demand for link adaptation. Operations 1440 may be indicative of operations occurring in a UE, such as UE 1205.

Operations 1440 may begin with the UE receiving a higher layer message from the cellular cell including information regarding the activation of a second carrier (i.e., a licensed carrier (different from that used by the cellular cell, referred to herein as the first carrier) or an unlicensed carrier) in the first carrier (block 1445). The UE may receive a physical layer message from the cellular cell that includes an aperiodic CSI trigger (block 1447). The physical layer message may be received from the cellular cell over the first carrier, for example. The physical layer message may serve as an indicator of the opportunistic transmission opportunity. The aperiodic CSI trigger may include information specifying a network resource in the second carrier the UE is to use to transmit a RS, such as a SRS. If the second carrier is an unlicensed carrier, the UE may perform a CCA to determine if the second carrier is available. When the second carrier is available or if the second carrier is a licensed carrier, the UE may transmit the RS (block 1451). The transmitting of the RS (and possibly the performing of the CCA) may be referred to as participating in a channel measurement procedure. The UE may communicate with opportunistically on/off cell (block 1453). Communications with the opportunistically on/off cell may include receiving data and possibly DL RS from the opportunistically on/off cell, for example.

The network nodes operating on the unlicensed carriers may need to monitor the channel usage regularly, and UEs may be configured for this as well. For these purposes, the cells may not transmit anything on some time/frequency resources. For the cells controlled by the same operator, they may mute at the same time (wideband on all channels, usually aligned with Wi-Fi channels), and no UE should transmit. The muting may be done periodically. A blank subframe pattern may be used, or a smaller time granularity may be used, such as slots/symbols, or a combination of these. Existing blanking patterns such as those defined for enhanced inter-cell interference coordination (eICIC) may be reused (and the signaling mechanism as well), but instead of an almost blank subframe (ABS), a blank subframe is used. The cells sense during the muting duration, and they may sense transmissions by other U-LTE systems or Wi-Fi systems. The statistics are recorded and may be used by the network to coordinate resource allocation/avoidance in U-LTE systems and to access the interactions with Wi-Fi systems, for example.

Therefore, to support intra-RAT coordination among U-LTE systems, a transmission may contain sufficient information for a receiver to determine which system/RAT is transmitting, which may be done by attempting to detect and decode the preambles of Wi-Fi transmissions, for example. If the transmission is not Wi-Fi (i.e., no Wi-Fi preamble is detected), then the system may know if it is another U-LTE system by examining the waveforms or exchanging information with other systems over backhaul. In addition, a subset of UEs may be configured to sense on the IMRs designed and configured for these purposes. Different from Release-11 IMRs, these IMRs occupy the full bandwidth of a channel for inter-RAT sensing. However, for intra-RAT sensing, with proper coordination, the IMRs may not necessarily occupy the entirety of the wideband as defined, but the interference on the IMR may be reported separately from CSI reporting. The CSI-IMR occupying the entire $9^{th}$ and $10^{th}$ symbols may be used for measurements, and/or measurements on specified blanking subframes may also be used. The IMRs may or may not be associated with any CSI processes, and the measurement may be similar to a received signal strength indicator (RSSI) as defined in 3GPP LTE Release-11 or Release-12.

The network may estimate long-term (at least seconds) traffic loads and channel usage on unlicensed carriers when sensing statistics are used. The network may then opportunistically avoid certain crowded channels and choose more favorable channels. The network may also intentionally avoid using some channels even if those channels are less crowded; instead, via spectrum sensing, Wi-Fi APs may move to those channels. A possible result is that Wi-Fi uses a subset of the channels and U-LTE uses another subset of the channels. This may be desirable since the U-LTE operations can take place efficient without constantly being concerning about the random access made by Wi-Fi devices, and UL transmissions can be supported by U-LTE, i.e., there may not be a need for performing a CCA before each transmission.

Wi-Fi may also work efficiently with co-existence issues regarding dense cellular. The LTE system may continue to monitor the entire bandwidth of the unlicensed spectrum and may adjust its occupancy of the channels based on relative loads and channel usages on all the channels of the unlicensed spectrum. The LTE system may predict possible equilibrium states of the channel usages and find a desirable one for both LTE and Wi-Fi. The LTE system may steer RATs and communications traffic to attain the desired equilibrium state.

According to an example embodiment, hybrid automatic repeat requested (HARQ) operation is implemented across more than one carrier. As an illustrative example, a first transmission results in a detecting/decoding error, and the data is to be retransmitted. If the retransmission has to occur in the same carrier as the original transmission, it may be delayed indefinitely depending on the channel sensing (CCA) results. Thus, it may be useful to perform the retransmission on a different and available carrier, such as a licensed carrier with more reliability. For UL HARQ, HARQ operation may need to be changed from synchronous to asynchronous. Additionally, a HARQ number may be included in the scheduling information. For DL HARQ, the UE needs to be signaled with necessary information to combine the transmissions from possibly different carriers. From a UE capability perspective, the total HARQ process number need not be larger and may be kept the same for each carrier. Additional information can be added so that the transmissions associated with one HARQ process are associated with the same information (e.g., an index), and that information may be added into the scheduling DCI. There may also be a semi-statically defined mapping by RRC signaling, down selecting candidate carriers for a HARQ process, thus reducing the signaling overhead for DCI.

Figure 15A:
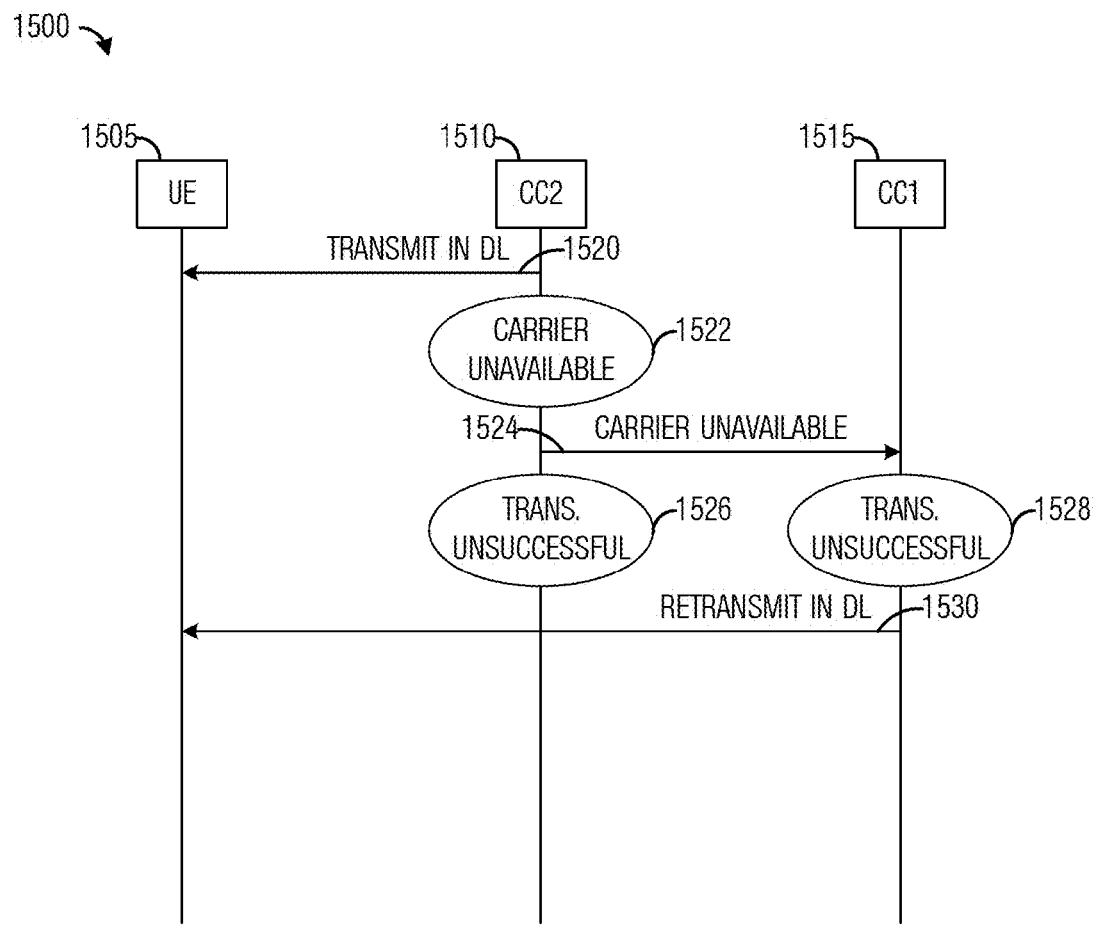
FIG. 15a illustrates a message exchange and processing diagram 1500 highlighting HARQ operation for a DL transmission according to example embodiments described herein.

FIG. 15a illustrates a message exchange and processing diagram 1500 highlighting HARQ operation for a DL transmission. Message exchange and processing diagram 1500 includes messages exchange and processing by a UE 1505, a CC2 1510, and a CC1 1515. In FIG. 15a, CC1 1515 may be a carrier that UE 1505 is monitoring (e.g., CC1 1515 may be Pcell or an activated Scell) and CC2 1510 is an opportunistically on/off cell and has fast backhaul with CC1 1515. CC2 1510 may transmit in the DL to UE 1505 (shown as event 1520). CC2 1510 may observe through measurements (e.g., CCA) or due to a timeout that its carrier is not available (block 1522). CC2 1510 may inform CC1 1515 (which may be a Pcell) that its carrier is unavailable (shown as event 1524). UE 1505 may have provided feedback to CC2 1510 (or CC1 1515) that the transmission by CC2 1510 (event 1520) was not received successfully (part of HARQ operation). Alternatively, a timeout or a busy channel may prevent UE 1505 from sending a HARQ ACK or NAK to CC2 1510. As a result, CC2 1510 and/or CC1 1515 may determine that the transmission was unsuccessful (block 1526 and/or 1528). CC1 1515 may continue the HARQ process by retransmitting in the DL to UE 1505 (shown as event 1530).

Figure 15B:
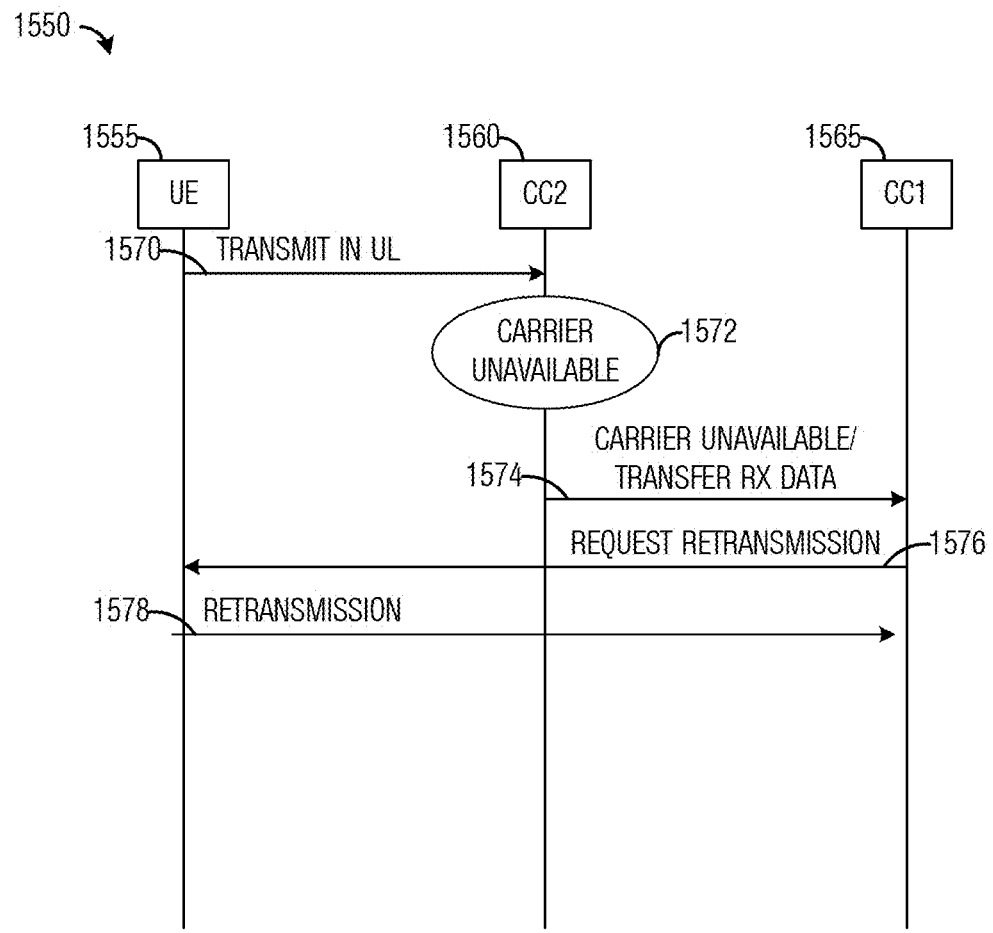
FIG. 15b illustrates a message exchange and processing diagram 1550 highlighting HARQ operation for an UL transmission according to example embodiments described herein.

FIG. 15b illustrates a message exchange and processing diagram 1550 highlighting HARQ operation for an UL transmission. Message exchange and processing diagram 1550 includes messages exchange and processing by a UE 1555, a CC2 1560, and a CC1 1565. In FIG. 15b, CC1 1565 may be a carrier that UE 1555 is monitoring (e.g., CC1 1565 may be Pcell or an activated Scell) and CC2 1560 is an opportunistically on/off cell and has fast backhaul with CC1 1565. UE 1555 may transmit in the UL to CC2 1560 (shown as event 1570). CC2 1560 may detect that its carrier is unavailable and cannot be used for UL transmissions (block 1572). CC2 1560 may inform CC1 1565 and may provide to CC1 1565 processed portions of the received transmission (e.g., soft data, log-likelihood ratios, and the like) (shown as event 1574). CC1 1565 may inform UE 1555 of a request for retransmission (shown as event 1576). The request for retransmission may include information about network resources to use for retransmission, such as redundancy version, process number, and the like. UE 1555 may retransmit in the UL to CC1 1565 (shown as event 1578).

Figure 16A:
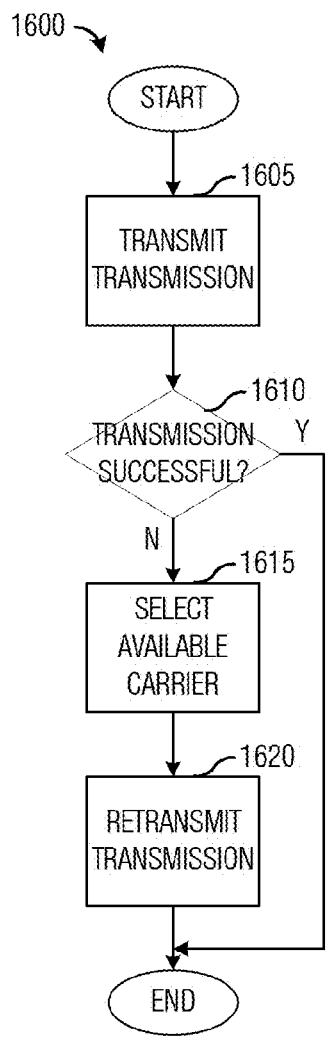
FIG. 16a illustrates a flow diagram of example operations in a transmitting device participating in HARQ operations according to example embodiments described herein.

FIG. 16a illustrates a flow diagram of example operations 1600 in a transmitting device participating in HARQ operations. Operations 1600 may be indicative of operations occurring in a transmitting device, such as a UE in a UL transmission and an eNB in a DL transmission, as the receiving device participates in HARQ operations.

Operations 1600 may begin with the transmitting device transmitting a transmission (block 1605). The transmission may occur in licensed spectrum or unlicensed spectrum. The transmitting device may perform a check to determine if the transmission was successful (block 1610). The transmission may be deemed successful if the transmitting device received a HARQ ACK (an acknowledgement for that HARQ process) from a receiving device. The transmission may be deemed not successful if the transmitting device received a HARQ NAK (a negative acknowledgement for that HARQ process) from the receiving device. The transmission may also be deemed not successful if the transmitting device does not receive any HARQ ACK from the receiving device within a specified time duration. An alternative feedback is setting a "1" to indicate acknowledgement and "0" to indicate negative acknowledgement.

If the transmission is not successful, the transmitting device may select an available carrier to retransmit the transmission (block 1615). The available carrier may be the same carrier used to transmit the original transmission or it may be a different carrier. It is noted that if the transmitting device is a UE, then it may be unlikely that the UE will be able to select the available carrier on its own. Instead, the UE may be instructed which carrier to use (by a Pcell or an opportunistically on/off cell, for example). The instruction may be in the form of an indicator of the carrier to use received in a message. The transmitting device may retransmit the transmission on the available carrier (block 1620). If the transmission is successful, operations 1600 may terminate.

Figure 16B:
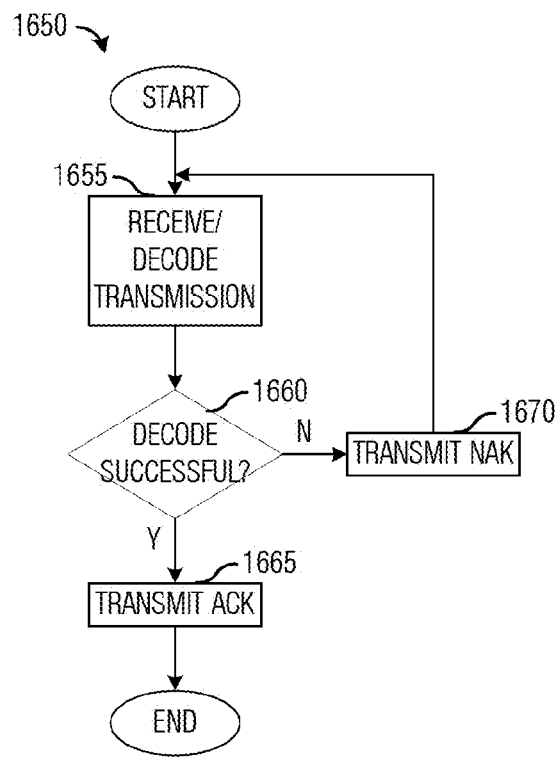
FIG. 16b illustrates a flow diagram of example operations in a receiving device participating in HARQ operations according to example embodiments described herein.

FIG. 16b illustrates a flow diagram of example operations 1650 in a receiving device participating in HARQ operations. Operations 1650 may be indicative of operations occurring in a receiving device, such as a UE in a DL transmission and an eNB in a UL transmission, as the receiving device participates in HARQ operations.

Operations 1650 may begin with the receiving device receiving and decoding a transmission (block 1655). The receiving device may perform a check to determine if it was able to successfully decode the transmission (block 1660). If the receiving device was able to successfully decode the transmission, the receiving device may transmit a HARQ ACK to a source of the transmission (block 1665). If the receiving device was not able to successfully decode the transmission, the receiving device may transmit a HARQ NAK to the source of the transmission (block 1670). The receiving device may return to block 1655 to receive and decode a retransmission of the transmission. There may be soft combining for re-transmission. When the receiving device is receiving a retransmission, the receiving device may implement soft combining to improve the likelihood of successful decoding. As an illustrative example, a decoder of the receiving device may operate on log-likelihood ratios (LLRs) generated from the received signals. In the case of a retransmission, the LLRs for the received retransmission may be combined with the LLRs from a previous transmission(s) (which may include the initial transmission and any number of retransmissions) of data. The combined LLRs may be decoded.

Figure 17:
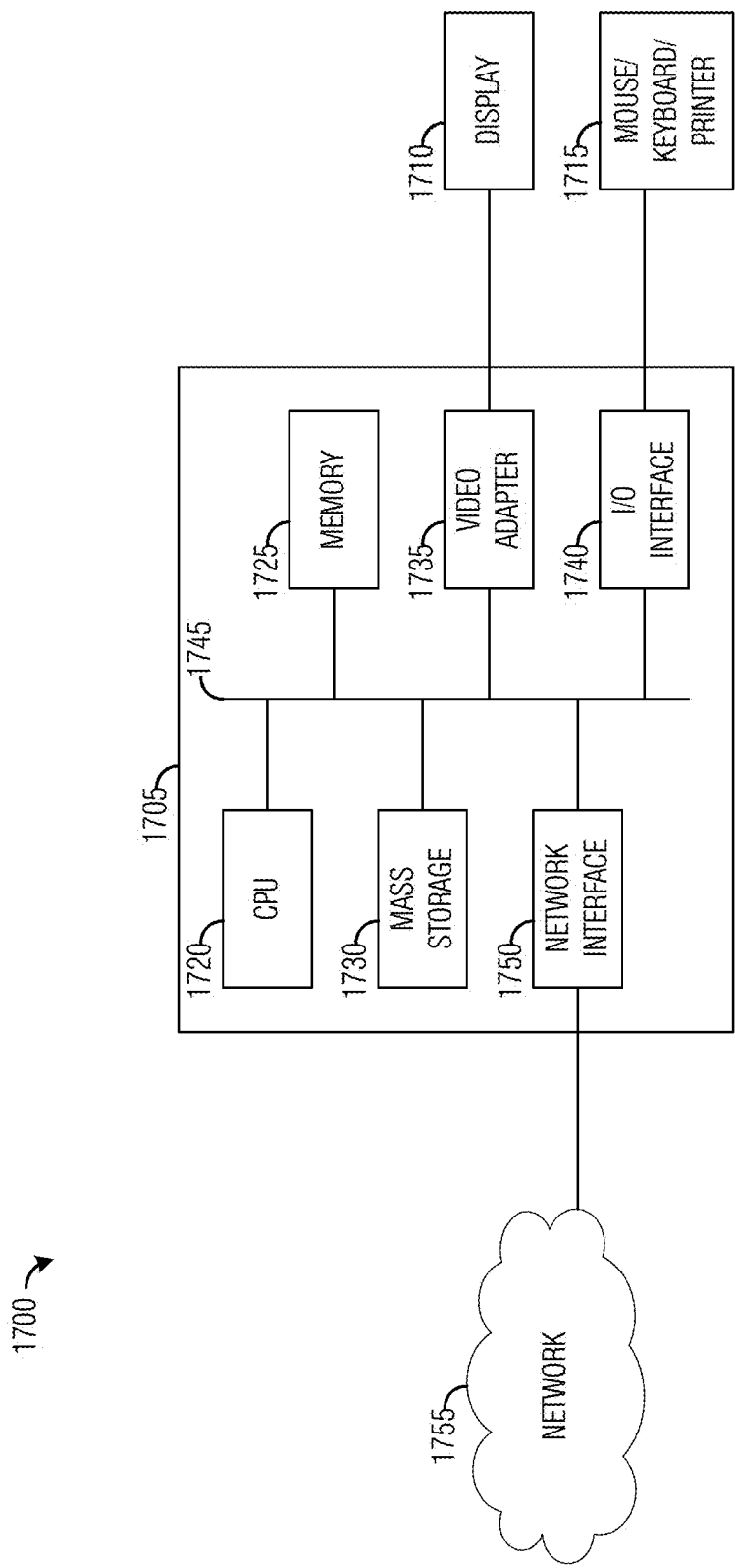
FIG. 17 is a block diagram of a processing system that may be used for implementing the devices and methods disclosed herein.

FIG. 17 is a block diagram of a processing system 1700 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1705 equipped with one or more input/output devices, such as a human interface 1715 (including speaker, microphone, mouse, touchscreen, keypad, keyboard, printer, and the like), display 1710, and so on. The processing unit may include a central processing unit (CPU) 1720, memory 1725, a mass storage device 1730, a video adapter 1735, and an I/O interface 1740 connected to a bus 1745.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 1750, which may comprise wired links, such as an Ethernet cable or the like, and/or wireless links to access nodes or different networks 1755. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for operating a first communications controller adapted for operation in a first communications carrier of a communications system with a plurality of communications carriers, the method comprising:
   signaling a first higher layer message to a user device in the first communications carrier, the first higher layer message including information regarding an activation of operations in a second communications carrier;
   coordinating with a second communications controller adapted for operations in the second communications carrier an opportunistic transmission opportunity in the second communication carrier;
   generating a first physical layer message comprising an aperiodic trigger configured to prompt a channel measurement in accordance with a reference signal, the first physical layer message serving as an indication of the opportunistic transmission opportunity;
   signaling, by the first communications controller to the second communications controller, instructions to begin transmitting the reference signal in the second communications carrier; and
   signaling the first physical layer message to the user device in the first communications carrier.

2. The method of claim 1, wherein the first physical layer message is signaled after the first higher layer message.

3. The method of claim 1, wherein a first transmission of the reference signal in the second communications carrier is coordinated with the signaling of the first physical layer message.

4. The method of claim 1, wherein a Layer 1 indicator indicates the opportunistic transmission opportunity in the second communication carrier.

5. The method of claim 1, wherein the aperiodic trigger comprises an aperiodic (sounding reference signal) SRS trigger.

6. The method of claim 1, further comprising:
   receiving a measurement report in the first communications carrier from the user device in accordance with the aperiodic trigger, wherein the measurement report is generated in accordance with the reference signal transmitted in the second communications carrier; and
   transmitting the measurement report to the second communications controller.

7. The method of claim 6, wherein the aperiodic trigger comprises an aperiodic channel state information (CSI) trigger.

8. The method of claim 6, wherein the first communications carrier is a licensed communications carrier and the second communications carrier is an unlicensed communications carrier, and wherein the method further comprises prior to signaling the first physical layer message, receiving a notification from the second communications controller that the second communications carrier is clear.

9. The method of claim 8, wherein the communications system is a Licensed-Assisted Access to Unlicensed Spectrum in Third Generation Partnership Project (3GPP) Long Term Evolution (LTE) (LAA or LAA-LTE) communications system.

10. The method of claim 1, further comprising:
    signaling the second communication controller to stop transmitting in the second communications carrier; and
    signaling a second higher layer message to the user device in the first communications carrier, the second higher layer message including information regarding a deactivation of operations in the second communications carrier.

11. The method of claim 10, further comprising signaling a second physical layer message to the user device in the first communications carrier, the second physical layer message including an indication for the user device to stop monitoring transmissions in the second communications carrier.

12. The method of claim 1, further comprising configuring user device configuration information for operation in the first communications carrier and the second communications carrier.

13. The method of claim 1, wherein the first communications carrier and the second communications carrier are different licensed communications carriers.

14. The method of claim 1, further comprising:
participating in a retransmission of a data packet with the user device, wherein the retransmission of the data packet is in the first communications carrier, and wherein the data packet was initially transmitted in the second communications carrier.

15. The method of claim 14, wherein a first hybrid automatic repeat requested (HARQ) process associated with the retransmission of the data packet in the first communications carrier corresponds to a second HARQ process associated with the initial transmitting of the data packet in the second communications carrier.

16. The method of claim 15, further comprising indicating an association of the first HARQ process and the second HARQ process to the user device.

17. The method of claim 14, wherein the retransmission of the data packet is in response to one of receiving a negative acknowledgement for the initial transmitting of the data packet, an expiring of a transmission timer associated with the initial transmitting of the data packet, and a receiving of a notification that the second communications carrier has become unavailable.

18. A method for operating a user device adapted for operation in a communications system with a plurality of communications carriers, the method comprising:
receiving a first higher layer message from a first communications controller over a first communications carrier, the first higher layer message including information regarding an activation of a second communications carrier;
receiving a first physical layer message from the first communications controller over the first communications carrier during a first subframe, the first physical layer message including an aperiodic trigger configured to initiate a channel measurement procedure in accordance with a reference signal (RS) transmitted in the second communications carrier initiated by instructions to begin transmitting the RS signaled from the first communications controller to a second communications controller adapted for operations in the second communications carrier, wherein the aperiodic trigger instructs the user device to begin a channel measurement procedure in a second subframe immediately following the first subframe, and wherein the first physical layer message serves as an indication of an opportunistic transmission opportunity in the second communications carrier;
monitoring the opportunistic transmission opportunity in the second communications carrier; and
participating in the channel measurement procedure in the second communications carrier.

19. The method of claim 18, wherein the aperiodic trigger comprises an aperiodic sounding reference signal (SRS) trigger, and wherein participating in the channel measurement procedure comprises:
transmitting a SRS to the second communications controller in a network resource in the second communications carrier.

20. The method of claim 19, further comprising receiving a transmission from the second communications controller in the second communications carrier.

21. The method of claim 19, wherein the first communications carrier is a licensed communications carrier and the second communications carrier is an unlicensed communications carrier, and wherein participating in the channel measurement procedure further comprises:
performing a clear channel assessment (CCA) to determine a state of the second communications carrier, wherein the SRS is transmitted in the second communications carrier when the state of the second communications carrier is clear.

22. The method of claim 18, wherein the aperiodic trigger comprises an aperiodic channel state information (CSI) trigger, and wherein participating in the channel measurement procedure comprises:
receiving the RS from the second communications controller in the second communications carrier;
generating a CSI report in accordance with a measurement of the received RS; and
transmitting the CSI report to the first communications controller in the first communications carrier.

23. The method of claim 22, wherein receiving the RS is coordinated by receiving the first physical layer message.

24. The method of claim 18, further comprising:
participating in a retransmission of a data packet in the first communications carrier, wherein an initial transmission of the data packet occurred in the second communications carrier.

25. The method of claim 24, wherein a first hybrid automatic repeat requested (HARQ) process associated with the retransmission of the data packet corresponds to a second HARQ process associated with the initial transmission of the data packet.

26. The method of claim 25, further comprising receiving an indication of an association of the first HARQ process and the second HARQ process.

27. The method of claim 24, wherein the participating of the retransmission of the data packet is in response to one of transmitting a negative acknowledgement corresponding to a receiving of the initial transmission of the data packet in the second communications carrier, an expiring of a transmission timer associated with the initial transmission of the data packet, and a receiving of a notification that the second communications carrier has become unavailable.

28. The method of claim 18, further comprising receiving a second higher layer message from the first communications controller in the first communications carrier, the second higher layer message including information regarding a deactivation of the second communications carrier.

29. The method of claim 28, further comprising receiving a second physical layer message from the first communications controller in the first communications carrier, the second physical layer message including an indication to stop monitoring the second communications carrier.

30. A first communications controller adapted for operation in a first communications carrier of a communications system with a plurality of communications carriers, the first communications controller comprising:
a processor; and
a computer readable storage medium storing programming for execution by the processor, the programming including instructions to:
signal a first higher layer message to a user device in the first communications carrier, the first higher layer message including information regarding an activation of operations in a second communications carrier, coordinate with a second communications controller adapted for operations in the second communications carrier, an opportunistic transmission opportunity in the second communication carrier, generate a first physical layer message comprising an aperiodic trigger configured to prompt a channel measurement in accordance with a reference signal, the first physical layer message serves as an indication of the opportunistic transmission opportunity, signal, by the first communications controller to the second communications controller, instructions to begin transmitting the reference signal in the second communications carrier; and signal the first physical layer message to the user device in the first communications carrier.

31. The first communications controller of claim 30, wherein the programming includes instructions to receive a measurement report in the first communications carrier from the user device in accordance with the aperiodic trigger, wherein the measurement report is generated in accordance with the reference signal transmitted in the second communications carrier, and transmit the measurement report to the second communications controller.

32. The first communications controller of claim 31, wherein the programming includes instructions to receive a notification from the second communications controller that the second communications carrier is clear prior to signaling the first physical layer message.

33. The first communications controller of claim 30, wherein the programming includes instructions to signal the second communication controller to stop transmitting in the second communications carrier and to signal a second higher layer message to the user device in the first communications carrier, the second higher layer message including information regarding a deactivation of operations in the second communications carrier.

34. The first communications controller of claim 30, wherein the programming includes instructions to participate in a retransmission of a data packet with the user device, wherein the retransmission of the data packet is in the first communications carrier, and wherein the data packet was initially transmitted in the second communications carrier.

35. The first communications controller of claim 34, wherein a first hybrid automatic repeat requested (HARQ) process associated with the retransmission of the data packet in the first communications carrier corresponds to a second HARQ process associated with the initial transmitting of the data packet in the second communications carrier.

36. A user device adapted for operation in a communications system with a plurality of communications carriers, the user device comprising:

a processor; and a computer readable storage medium storing programming for execution by the processor, the programming including instructions to:

receive a first higher layer message from a first communications controller over a first communications carrier, the first higher layer message including information regarding an activation of a second communications carrier, receive a first physical layer message from the first communications controller over the first communications carrier during a first subframe, the first physical layer message including an aperiodic trigger configured to initiate a channel measurement procedure in accordance with a reference signal (RS) transmitted in the second communications carrier initiated by instructions to begin transmitting the RS signaled from the first communications controller to a second communications controller adapted for operations in the second communications carrier, wherein the aperiodic trigger instructs the user device to begin a channel measurement procedure in a second subframe immediately following the first subframe, and wherein the first physical layer message serves as an indication of an opportunistic transmission opportunity in the second communications carrier, monitor the opportunistic transmission opportunity in the second communications carrier, and participate in the channel measurement procedure in the second communications carrier.

37. The user device of claim 36, wherein the aperiodic trigger comprises an aperiodic sounding reference signal (SRS) trigger, and wherein the programming includes instructions to transmit a SRS to the second communications controller in a network resource in the second communications carrier.

38. The user device of claim 37, wherein the first communications carrier is a licensed communications carrier and the second communications carrier is an unlicensed communications carrier, and wherein the programming includes instructions to perform a clear channel assessment (CCA) to determine a state of the second communications carrier, wherein the SRS is transmitted in the second communications carrier when the state of the second communications carrier is clear.

39. The user device of claim 36, wherein the aperiodic trigger comprises an aperiodic channel state information (CSI) trigger, and wherein the programming includes instructions to receive the RS from a second communications controller in the second communications carrier, generate a CSI report in accordance with a measurement of the received RS, and transmit the CSI report to the first communications controller in the first communications carrier.

40. The user device of claim 36, wherein the programming includes instructions to participate in a retransmission of a data packet in the first communications carrier, wherein an initial transmission of the data packet occurred in the second communications carrier.

* * * * *